United States Patent [19]

Denk

[11] 4,124,383

[45] Nov. 7, 1978

[54] DIFFUSION TRANSFER COLOR PRODUCTS AND PROCESSES EMPLOYING SILVER HALIDE GRAINS COMPRISING IODIDE

[75] Inventor: Edward G. Denk, Lexington, Mass.

[73] Assignee: Polaroid Corporation, Cambridge, Mass.

[21] Appl. No.: 704,952

[22] Filed: Jul. 13, 1976

Related U.S. Application Data

[63] Continuation-in-part of Ser. No. 460,719, Apr. 15, 1974, abandoned.

[51] Int. Cl.[2] ........................ G03C 7/00; G03C 5/54; G03C 1/76; C03C 1/40

[52] U.S. Cl. ........................ 96/3; 96/29 D; 96/73; 96/74; 96/76 C; 96/77; 96/94 R

[58] Field of Search ........................ 96/3, 29 D, 73, 74, 96/77, 94 R, 76 C

[56] References Cited

U.S. PATENT DOCUMENTS

| | | | |
|---|---|---|---|
| 3,415,650 | 12/1968 | Frame et al. | 96/94 R |
| 3,697,269 | 10/1972 | Timson | 96/77 |
| 3,697,270 | 10/1972 | Timson | 96/77 |
| 3,697,271 | 10/1972 | Timson | 96/77 |
| 3,706,566 | 12/1972 | Shiba et al. | 96/94 R |
| 3,784,381 | 1/1974 | Perignon | 96/94 R |
| 3,960,557 | 6/1976 | Timson | 96/94 R |

*Primary Examiner*—Richard L. Schilling

*Attorney, Agent, or Firm*—Stanley H. Mervis

[57] ABSTRACT

Color diffusion transfer products and processes are provided incorporating light-sensitive photographic emulsions comprising silver halide grains having an iodide content of about 0.2 to 1.5 mole percent and a mean volume diameter of about 0.05 to 2 $\mu$, the grain size distribution thereof exhibiting a coefficient of variatin of less than about 35 percent. Preferably, the iodide content of the halide emulsion is about 0.625 percent, the mean volume diameter is about 0.9 to 1.2 $\mu$, and the coefficient of variation is less than 30 percent. The reamining halides in the grains may be bromide or bromide and chloride. The silver halide emulsions are prepared by single jet techniques.

36 Claims, 22 Drawing Figures

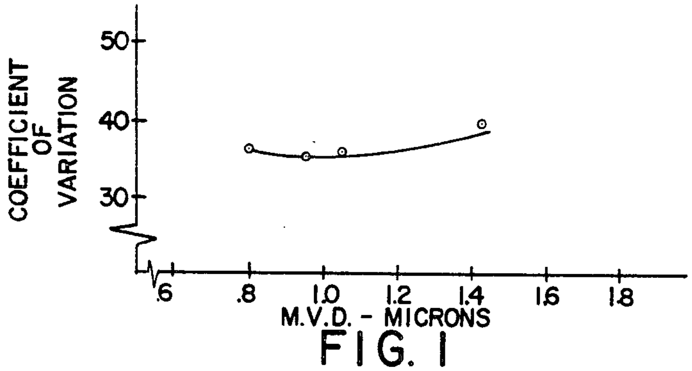
FIG. 1
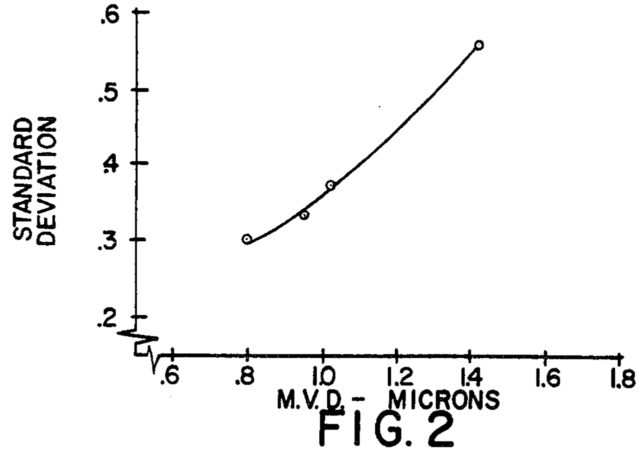
FIG. 2
FIG. 3
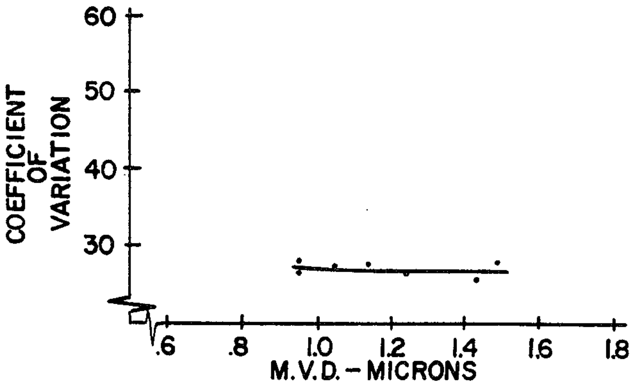
FIG. 4
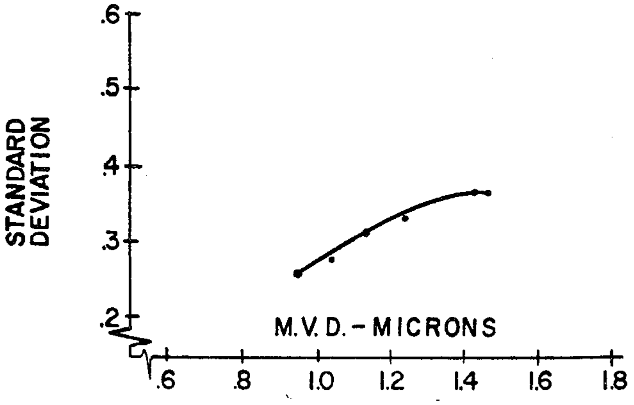

DIFFUSION TRANSFER COLOR PRODUCTS AND PROCESSES EMPLOYING SILVER HALIDE GRAINS COMPRISING IODIDE

This case is a continuation-in-part of application Ser. No. 460,719 filed Apr. 15, 1974 and now abandoned.

BACKGROUND OF THE INVENTION

The present invention is directed to new and improved diffusion transfer process photographic film units adapted to provide, as a function of the point-to-point degree of photoexposure, by diffusion transfer processing, a dye transfer image and to an improved light-sensitive silver halide emulsion and its utilization therewith.

Diffusion transfer photographic color systems generally depend upon the differential migration or mobility of a dye or dyes to provide color image formation. Differential dye mobility serves to define the resultant image of the system and is provided as a function of the development of exposed silver halide. For example, such differential mobility or solubility may be obtained by a redox reaction or coupling reaction. The imagewise distribution of the mobile dye material is selectively transferred, at least in part, by diffusion to a superposed or contiguous dyeable stratum to impart thereto the desired color transfer image.

Generally, multicolor images are obtained by employing a film unit containing at least two selectively sensitized silver halide emulsions each having associated therewith a dye image-providing material exhibiting desired spectral adsorbtion characteristics. Tripack structures usually are employed within the film units incorporating a blue-, a green-, and a red-sensitive silver halide layer having associated therewith, respectively, a yellow, a magenta and a cyan dye image-providing material.

The particular diffusion transfer system within which photosensitive silver halide layers are utilized may assume any of several diverse geometries and modes of image generating technique. For instance, one system as is described in U.S. Pat. No. 2,983,606 employs a photosensitive element comprising silver halide layers each of which is associated with a dye developer, a compound which is both a silver halide developing agent and a dye. Following exposure of the element it is developed by applying an aqueous alkaline processing composition thereto. The dye developer is oxidized in developed areas to provide an oxidation product which is appreciably less diffusible than the unoxidized dye developer. As a consequence, an imagewise differential distribution of diffusible dye developer may be transferred by diffusion to an image-receiving stratum which then carries the resultant positive dye transfer image. In one preferred system this image-receiving stratum or layer is superposed upon the photosensitive element subsequent to the exposure thereof and the processing composition is applied from a rupturable container forming part of the overall film unit. Following a suitable interval of imbibition permitting diffusion transfer, the resultant image is revealed by separation of the image-receiving element from the photosensitive element.

Other diffusion transfer systems have been introduced and proposed wherein the film unit is a composite structure of photosensitive element, reception layer and processing composition container. As disclosed in U.S. Pat. No. 3,672,890 a composite photosensitive structure, particularly adapted for reflection type photographic diffusion transfer color process employment, is shown to comprise a plurality of essential layers including, in sequence, a dimensionally stable layer preferably opaque to actinic radiation; one or more silver halide emulsion layers having associated therewith a diffusion transfer process dye image-providing material; a polymeric layer adapted to receive solubilized dye image-providing material diffusing thereto; and a dimensionally stable transparent layer. Following exposure to incident actinic radiation, the unit is processed by interposing, intermediate the silver halide emulsion layer and the reception layer, a processing composition including a light-reflecting agent.

The composite structure includes a rupturable container retaining the processing composition and the opacifying agent which is fixedly positioned along a transverse leading edge of the structure. Accordingly, upon removal of the unit from the camera, this rupturable container is subjected to an initial compressive pressure to effect the discharge of its contents intermediate the noted receiving layer and next adjacent silver halide emulsion.

The liquid processing composition, distributed intermediate the receiving layer and the silver halide emulsion, permeates the silver halide emulsion layers of the structure to initiate development of the latent images contained therein resultant from photoexposure. As a consequence of the development of the latent images, the diffusibility of dye image-providing material associated with each of the silver halide emulsion layers is controlled as a function of the point-to-point degree of the respective silver halide emulsion layers photoexposure. An imagewise distribution of mobile dye image-providing materials transfers by diffusion to the reception layer to provide the desired transfer dye image. Subsequent to substantial dye image formation in the image-receiving layer, means associated with the film unit structure are adapted to convert the pH of the film unit from a first processing pH at which the image dye-providing material is diffusible to a second pH at which such diffusion is substantially terminated and the transfer dye image exhibits increased stability. Preferably a sufficient portion of the alkaline ions of the processing composition transfer, by diffusion, to a polymeric neutralizing layer to effect reduction in the alkalinity of the composite film unit from a first alkaline processing pH to the second pH at which further dye image-providing material transfer is substantially obviated.

The transfer dye image may be viewed, as a reflection image, through the dimensionally stable transparent layer against a white background provided by the light-reflecting agent. This agent is distributed as a component of the processing composition intermediate the reception layer and next adjacent silver halide emulsion layer. The light-reflecting stratum serves to mask residual dye image-providing material retained in association with the developed silver halide emulsion layers subsequent to processing.

As disclosed in U.S. Pat. Nos. 3,615,421 and 3,661,585, the light-reflecting layer of the film unit may be initially disposed as a preformed processing composition permeable layer intermediate the reception layer and next adjacent silver halide layer in a concentration which prior to photoexposure is insufficient to prevent transmission therethrough of exposing actinic radiation and which, subsequent to processing, possesses a covering power effective to mask residual dye image-providing material retained associated with the developed silver halide emulsion layers. In U.S. Pat. No. 3,647,435, the light-reflecting layer of the film unit optionally may be initially formed in situ intermediate the reception layer and next adjacent silver halide layer during photographic processing of the film unit.

In U.S. Pat. No. 3,647,437, an opacifying system is disclosed comprising a light-absorbing reagent such as a dye which is present as an absorbing species at a first pH and which is converted to a substantially non-absorbing species at a second pH.

In U.S. Pat. No. 3,573,043, the polymeric neutralizing layer is disclosed to be optionally disposed intermediate the dimensionally stable opaque layer and next adjacent essential layer, i.e., the next adjacent silver halide/dye image-providing material component, to effect the designated modulation of the film unit's environmental pH. U.S. Pat. No. 3,576,625 discloses the employment of particulate acid distributed within the film unit to effect the modulation of the environmental pH. U.S. Pat. No. 3,573,044 discloses the employment of processing composition solvent vapor transmissive dimensionally stable layers to effect process modulation of dye transfer as a function of solvent concentration.

Another type of film unit may be constructed in accordance with the disclosure of U.S. Pat. Nos. 3,594,165 and 3,689,262. This composite photosensitive structure includes a transparent dimensionally stable layer carrying an image-receiving layer, a processing composition permeable light-reflecting layer, a photosensitive silver halide layer. The film unit further includes a separate dimensionally stable sheet element superposed on the surface of the photosensitive structure opposite the dimensionally stable layer as well as a rupturable container retaining processing composition for distribution of that processing composition intermediate the sheet and the photosensitive structure to effect processing.

Deriving an acceptable performance for color diffusion transfer film units has been found to rest upon a great number of factors. Such performance requires adequate speeds, optimization of the photoresponse gradiant traditionally represented by the curve shape of H and D type curves integrating color image density as a function of film unit photoexposure. Further, diffusion transfer processing must be operational over acceptably broad temperature ranges, must exhibit practical storage stability as well as exhibit an efficient and effective utilization of silver.

Extensive investigation has been conducted into both the basic content and particulate structures of silver halide emulsions utilized with photographic products. For diffusion transfer process film structures, such investigations are described, for instance in U.S. Pat. Nos. 3,697,269, 3,697,270 and 3,697,271. Those patents, as well as other publications, describe, inter alia, that optimized particulate silver halide distributions are desirably narrow in character, dysfunctions usually occuring where a particulate distribution extends into excessively fine sizes or excessively large grain structures. Generally, lower sensitivity is evidenced where excessively fine grain structures are encountered and unacceptable fog levels may be witnessed where a given distribution incorporates a too high proportion of grains of excessive size. Such narrow distributions have been obtained by fractionation techniques or by double jet silver halide preparation techniques, with, in some instances, blending of narrow fractions.

SUMMARY OF THE INVENTION

The present invention is directed to improved color diffusion transfer processes and films. The silver halide emulsions employed are prepared by single jet techniques and may be characterized as non-regular in habit, having a high proportion of plate-like grains with twinning. These silver halide emulsions have a mean volume diameter of about 0.5 to 2 $\mu$, an iodide content of about 0.2 to 1.5 mole percent, and a coefficient of variation of less than about 35%, more preferably less than 30%. In the preferred embodiments, the silver halide emulsions have a mean volume diameter of about 0.9 to 1.2 $\mu$, and more preferably about 1 $\mu$; an iodide content of about 0.4 to 0.8 mole percent, and more preferably about 0.625 mole percent; and a coefficient of variation of less than about 30%.

The film unit structure to be employed in the practice of the present invention preferably is of a variety including a photosensitive element and an image-receiving element which are superposed, or superposable, in combination with a rupturable container retaining an aqueous alkaline processing composition, and will include at least one silver halide layer having grains with an iodide content, a mean volume diameter and size distribution as defined above.

The invention further contemplates the provision of a light-sensitive photographic emulsion comprising silver halide grains having less than a 1.5 mole percent iodide content and this content is further selected to provide a grain size distribution exhibiting a coefficient of variation having a value substantially less than the value of that coefficient as it is exhibited for a 1.5 mole percent iodide content. The remaining halide within the grain distribution may be bromide and/or chloride. The noted iodide content further may be selected between about 0.2 and 1.5 mole percent. Thus selected, resultant coefficient of variations for the grain distributions are found to have unexpectedly low values permitting the minimization of dysfunctions within the photographic emulsion system.

In another embodiment of the invention, diffusion transfer images in color are provided in the film unit structures by exposing a film unit incorporating a direct negative, i.e., negative working, silver halide layer comprising silver halide grains with an iodide content, mean volume diameter and coefficient of variation as defined above. The silver halide layer is associated with a dye image-providing material. The layer is contacted with the processing composition and a development of the photoexposed silver halide ensues. An imagewise distribution of diffusible dye image-providing material as a function of the noted exposure is provided and a portion of the imagewise distribution of the dye image-providing material is transferred by diffusion to an image-receiving element dyeable by the dye image-providing material to impart thereto a dye image.

Film unit structures which may be employed in the practice of the invention may comprise a film unit of the general type as set forth in U.S. Pat. Nos. 3,415,644; 3,415,645; 3,415,646; 3,473,925; 3,573,042; 3,573,043; 3,573,044; 3,647,437; 3,615,421; 3,576,625; 3,576,626; 3,620,724; 3,594,165; 3,594,164; 3,647,434; 3,647,435; 2,983,606 and 3,345,163 and will include at least one photosensitive silver halide layer which comprises silver halide grains having an iodide content, mean volume diameter and coefficient of variation as described above, in a photosensitive element which contains a plurality of layers including, in relative order, a dimensionally stable layer which may be opaque to incident actinic radiation; one or more photosensitive silver halide layers having associated therewith dye image-forming material which provides a processing composition diffusible imagewise distribution of image-forming material as a function of the point-to-point degree of silver halide layer exposure to incident actinic radiation; and a layer adapted to receive image-forming material diffusing thereto. In certain embodiments the image-receiving layer is carried by a dimensionally stable layer transparent to incident actinic radiation, and means are provided for interposing, intermediate the silver halide and the reception layer, a light-reflecting agent and a processing composition, such processing composition possessing a first pH at which the dye image-forming material is diffusible during processing and means for modulating the pH of the film unit from the first pH to a second pH at which the dye image-forming material is substantially non-diffusible.

BRIEF DESCRIPTION OF THE DRAWINGS

FIGS. 1 through 4 are curves relating Coefficient of Variation and Standard Deviation with Mean Volume Diameter for selected grain size distributions of selected silver halide emulsions;

DETAILED DESCRIPTION

Figure 5:
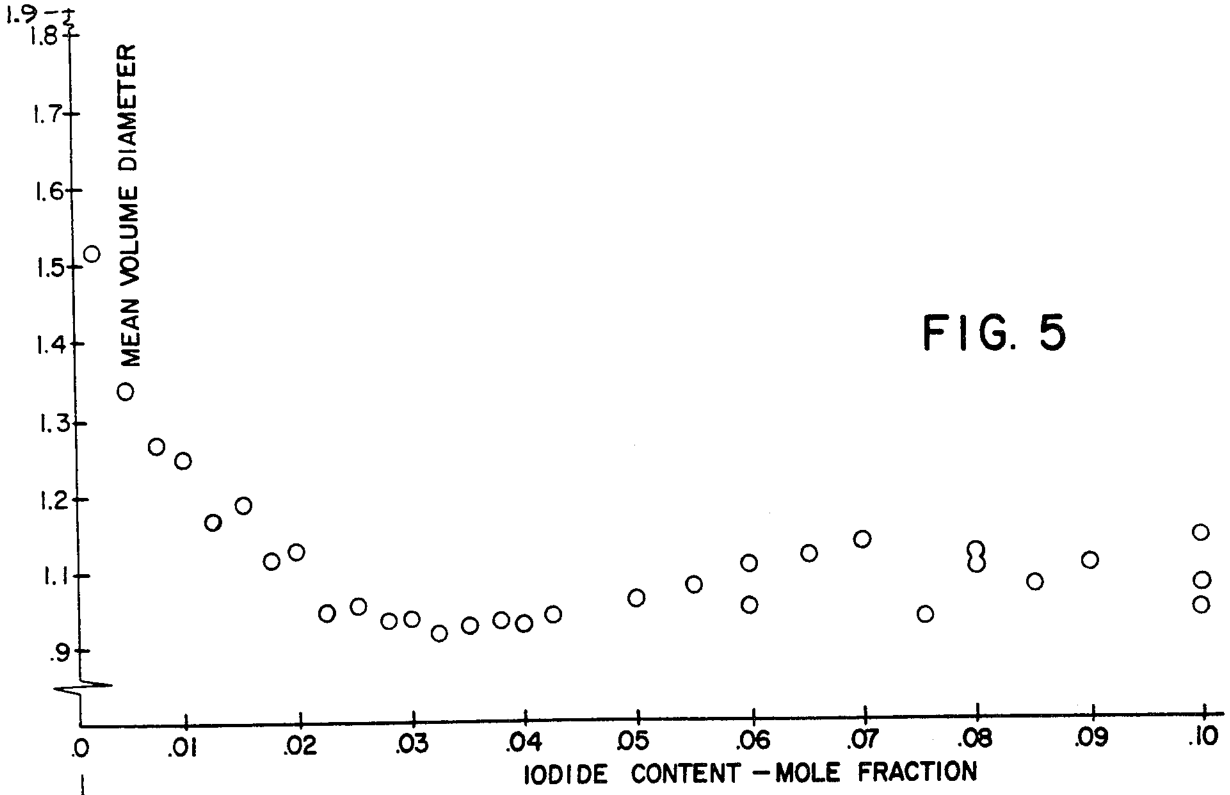
FIGS. 5–7 are curves relating respectively mole fraction of iodide content with Mean Volume Diameter, Standard Deviation and Coefficient of Variation for a series of silver halide samples having varying iodide contents from about 0 to 0.10.

Employing the photosensitive silver halide emulsions of the present invention with diffusion transfer type photographic systems will be seen to provide film units of improved operational characteristics. This improvement stems principally from a discovered capability for controlling relative halide dispersion, i.e., optimizing the frequency distribution of silver halide grain size within the emulsion. In particular, this distribution of grain size may be narrowed about an optimized mean size to desirably limit the range of such grain sizes. Where such grain size distributions are optimally limited, an avoidance of the presence of a substantial portion or number of grains possessing higher than desired diameters may be realized. As such grains become larger beyond an optimal value, they possess, as a function of surface area, a proclivity for formation of undesired fog, which proclivity also generally increases as a direct function of increase in processing temperature, with the concomatent result of less efficient and effective utilization of a selected silver halide concentration per unit weight, degradation of image recordation, acuity and corresponding dye transfer image construction. Conversely, the presence of a substantial number of grains having a diameter below an optimum value will be found to inject a relatively low effective sensitivity to exposure radiation within the structure. This low effective sensitivity results in less efficient utilization of the silver halide to provide dye transfer image formation.

The silver halide emulsions of this invention may be derived by selecting the iodide content thereof within a uniquely defined range. This range is discoverable through a refined statistical analysis of grain size frequency distributions corresponding with variations of iodide content. Generally, investigations of halide emulsion grain populations have centered about frequency (size) analyses which revealed basic size concentrations. The investigation leading to the discovery of the present invention considered in detail statistical data including the Mean Volume Diameter (M.V.D.), Standard Deviation, ($\sigma$), and Coefficient of Variation (C.V.) of a series of silver halide grain dispersions.

The "Mean Volume Diameter" is a small particle statistical evaluation which is disclosed in "Small Particle Statistics" by G. Herdan, Second Rev. Ed., Butterworths, London. M.V.D. may be derived from the general expression:

$$d_v = \frac{\sum_i (d_i)^4 n_i}{\sum_i (d_i)^3 n_i}$$

Where: $d_v$ is mean volume diameter and $n_i$ is the number of particles in size class $d_i$.

Analysis of grain structure to derive Mean Volume Diameter may be provided from several well-known procedures, i.e., electron microscopy, Coulter Count devices and the like.

The "Coulter Counter," a device marketed by Coulter Electronics, Inc., 590 West 20th Street, Hialeah, Florida, is a particle size distribution analyzer wherein particles suspended in electrolyte are sized and counted upon being passed through a specific path of current flow for some length of time.

The use of computed standard deviation for given emulsion sample grain populations is a well-known statistical technique. The Standard Deviation is the positive square root of the Variance of a population, Variance, in turn, representing the mean squared deviation of the individual values from the population mean.

The Coefficient of Variation (C.V.) is the Standard Deviation expressed as a percentage of the arithmetic mean (mean volume diameter):

$$C.V. = (\sigma/\mu) \times 100(\%)$$

Since $\sigma$ and M.V.D. are both expressed in the same units as the variant, C.V. is independent of the units of measurement, the position of origin being known. The Coefficient of Variation typically is utilized to compare variability of groups of observations with widely differing mean levels. A more detailed discussion of the Coefficient of Variation as well as general statistical methods utilized in such analyses as are now presented is provided in "Statistical Methods in Research and Production" by Davies and Goldsmith, 4th edition, Hafner Publishing Company, New York, 1972.

The significance of the Coefficient of Variation to the analysis leading to the discovery of the present invention may be observed in connection in FIGS. 1 through 4. These figures show, in chart form, a plot of Standard Deviation, $\sigma$, with respect to Mean Volume Diameter, M.V.D., (FIGS. 2 and 4), and a plotting of Coefficient of Variation with respect to the same Mean Volume Diameters. FIGS. 1 and 2 were derived from emulsion samples containing a 2.0 mole percent iodide content while FIGS. 3 and 4 were derived from emulsion samples containing 0.625 mole percent iodide. Note that in each of the charts (FIGS. 2 and 4) the Standard Deviation increases in correspondence with increases in Mean Volume Diameter. On the other hand, the Coefficient of Variation (FIGS. 1 and 3) is relatively independent of Mean Volume Diameter. This illustrates that the Coefficient of Variation is a uniquely effective measure of the relative narrowness of an emulsion grain size distribution inasmuch as it is independent of mean grain size.

In deriving the unique and advantageous iodide range for the photographic emulsion of the invention, a first set of experiments was conducted wherein a series of idobromide emulsions having varying iodide levels were made, following which they were analyzed utilizing the above described Coulter technique to determine Mean Volume Diameter, Standard Deviation and Coefficient of Variation. Iodide level variations ranged from 0 to 10 mole percent.

The emulsion samples were formulated by single jet technique. As an example, one sample, the dispersion characteristic of which forms part of the data of FIGS. 5–7 was formulated by a conventional single jet addition over a period of 25 minutes, of 2203 grams of a solution at room temperature of 9.26% by weight silver nitrate in deionized water, the rate of addition being 88 gms/min, to a make pot containing a solution of 150 grams of a 10% solution of derivatized gelatin, 187.6 grams potassium bromide, 125 grams of a 10% solution of potassium iodide in 962.8 grams of distilled water. The pot contents were maintained at 58° C. and adjusted to a pH of 6.30 using a 2N potassium hydroxide solution. A 5 ml sample of the resultant emulsion was taken to which was added 1 ml of a 1% solution of 1-phenyl-5-mercapto tetrazole (PMT) and 8 ml of a 15% by weight gelatin solution.

Figure 6:
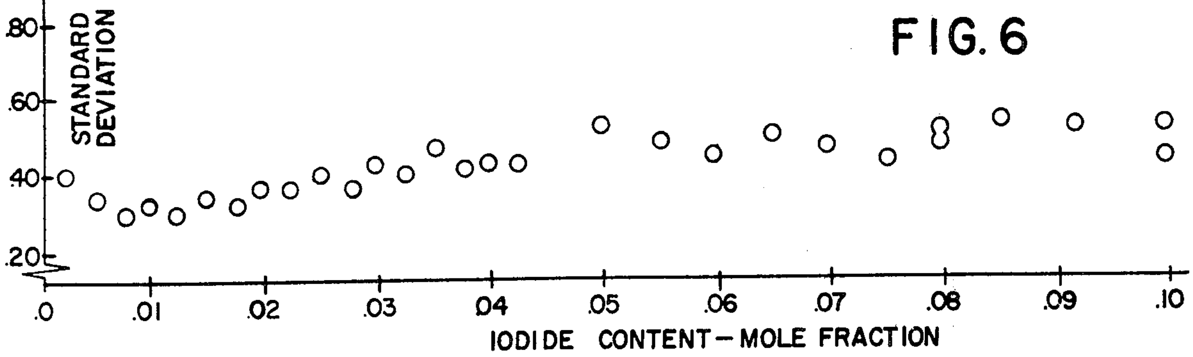
Figure 7:
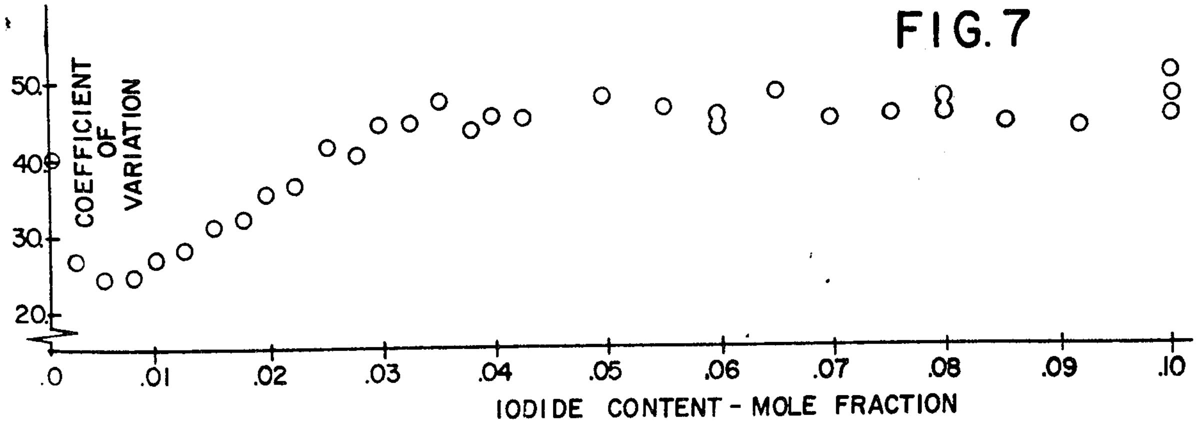

Upon appropriate completion of their formulation, the varying iodide content samples were analyzed utilizing the noted Coulter device and the resultant data was evaluated. This data, as represented in FIGS. 5, 6, and 7, shows the variation of Mean Volume Diameter, Standard Deviation, and Coefficient of Variation, respectively, as they relate to corresponding variations of iodide content. Note in FIG. 5 that as the iodide level is increased from 0 mole percent, Mean Volume Diameter decreases until about a 3.0 mole percent iodide level is reached. As the iodide level is increased beyond 3.0 mole percent, a small increase in the Mean Volume Diameter up to a 5.5 mole percent level was witnessed. From about 5.5 to 10.0 mole percent iodide content the Mean Volume Diameter appears to evolve in independence of the iodide level. Looking to FIG. 6, it may be observed that the corresponding Standard Deviation values appear to follow the pattern of the Mean Volume Diameter.

Referring to FIG. 7, a significant discovery is revealed by the data correlating Coefficient of Variation with Mean Volume Diameter at iodide levels below 1.5 mole percent. Note that instead of a contiuum of relatively high Coefficient of Variation values extending from that at 0.0 mole percent iodide, a region of significant drop in the value of the Coefficient is witnessed reaching a median low value of about 25 percent at about a 0.625 mole percent iodide content. As may be observed, below 1.5 mole percent iodide content and within a range of about 0.2 to 1.5 mole percent iodide content, an importantly narrowed grain size distribution is in evidence. Such narrow distribution allows a greater latitude in emulsion design as described hereinabove.

A more comprehensive view of the noted region of interest is provided in Table I below. In this table, a series of emulsions identified by the labels WM 3223–WM 3245, progressively varying from each other by iodide mole fractions of 0.001 are revealed in combination with their corresponding Coefficients of Variation, (C.V.). Additionally, make temperature, jet time and M.V.D. for each emulsion are delineated.

Table 1

| Emulsion | Moles Fraction I | Make Temp | Jet Time | MVD Mic. | C.V. |
|---|---|---|---|---|---|
| WM 3223 | .000 | 43° C | 25.1′ | .999 | 46.512 |
| WM 3224 | .001 | 46° C | 25.3′ | .985 | 36.384 |
| WM 3225 | .002 | 50° C | 24.7′ | .916 | 30.006 |
| WM 3226 | .003 | 52° C | 24.8′ | .913 | 30.680 |
| WM 3227 | .004 | 52° C | 24.9′ | 1.001 | 29.216 |
| WM 3228 | .005 | 56° C | 24.7′ | 1.017 | 28.218 |
| WM 3229 | .006 | 56° C | 25.1′ | .947 | 29.265 |
| WM 3222 | .00625 | 58° C | 24.8′ | .978 | 29.347 |
| WM 3230 | .00625 | 58° C | 25.5′ | .993 | 29.468 |
| WM 3231 | .007 | 58° C | 25.2′ | .995 | 28.842 |
| WM 3232 | .008 | 58° C | 24.9′ | .935 | 29.851 |
| WM 3233 | .009 | 59° C | 25.0′ | .947 | 30.040 |
| WM 3234 | .010 | 60° C | 24.8′ | .943 | 31.098 |
| WM 3235 | .011 | 60° C | 25.0′ | .937 | 31.892 |
| WM 3236 | .012 | 61° C | 24.7′ | .948 | 31.554 |
| WM 3237 | .013 | 61° C | 25.0′ | .921 | 34.777 |
| WM 3238 | .014 | 62° C | 25.3′ | .934 | 34.065 |
| WM 3239 | .015 | 63.5° C | 24.8′ | .944 | 33.769 |
| WM 3240 | .016 | 63.5° C | 25.1′ | .934 | 36.098 |
| WM 3241 | .017 | 64.0° C | 24.8′ | .955 | 35.656 |
| WM 3243 | .018 | 64.0° C | 25.2′ | .938 | 39.806 |
| WM 3244 | .019 | 65.0° C | 25.2′ | .953 | 39.242 |
| WM 3245 | .020 | 65.0° C | 25.1′ | .981 | 40.008 |

Note that for Coefficients of Variation of about 30% and, more particularly of about 29% ± 1%, the corresponding iodide content range is about 0.2 mole % to 0.9 mole %.

A second series of experiments were conducted to determine the presence or absence of the unusually low value of Coefficient of Variation at substantially the same iodide content range, but within a tri-halide emulsion formulation.

A series of tri-halide emulsion samples were formulated to provide for a 0.50 mole percent chloride content in the grain and a mean volume grain diameter of one micron. As an example of one of these samples, a solution at room temperature of 9.26% by weight silver nitrate in distilled water was dispensed by single jet technique over 25 minutes at a rate of 88 grams per minute to a make pot containing a solution of 208 grams of a 10% derivatized gelatin in distilled water, 141.2 grams potassium bromide, 27.3 grams potassium chloride, 12.0 grams of a 10% solution of potassium iodide in distilled water and 907 grams distilled water. Make temperature was maintained at 60° C. and the pH of the mixture was observed to be 5.85. A 5 ml sample of the resultant emulsion was taken to which was added 1 ml of a 1% solution of 1-phenyl-5-mercaptotetrazole (PMT) and 8 mls of a 15% by weight gelatin solution. The above sample provided data at a 0.600 mole percent iodide content level. Techniques in preparing other samples following grain development, in some instances varied but remained within standard procedural bounds and did not alter the thus developed grain structures.

Make temperatures for all samples were adjusted to encourage the development of a 1.0 micron Mean Volume Diameter.

Figure 8:
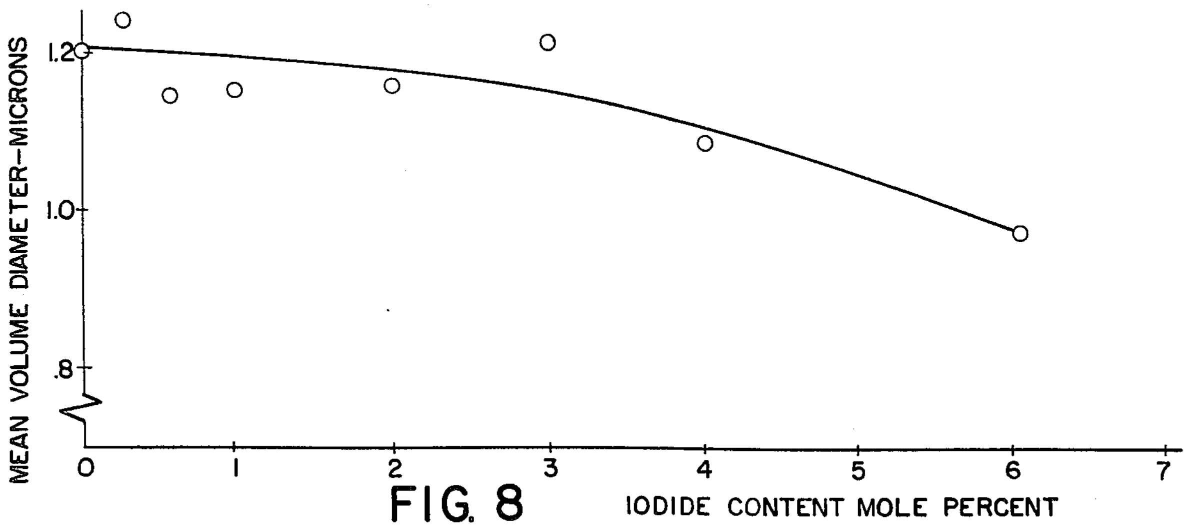
FIGS. 8–10 are curves relating iodide content respectively with Mean Volume Diameter, Standard Deviation and Coefficient of Variation for a series of silver halide samples having varying iodide content.

The set of samplings produced having a 0.5 mole percent chloride content in a halide dispersion was submitted to analysis by the noted Coulter technique. This analysis provided data interrelating Mean Volume Diameter, Standard Deviation, and Coefficient of Variation. Resultant data as derived, is plotted, respectively, in FIGS. 8, 9, and 10.

The similarity in the shape of the Standard Deviation Curve (FIG. 9) to the shape of the curve showing Coefficient of Variation stems from the above-noted normalization of M.V.D. grain size to one micron.

A series of tri-halide emulsion samples were formulated to provide for a 2.0 mole percent chloride content in a grain dispersion having a Mean Volume Diameter of 1.0 micron. As an example of one of these samples, a solution at room temperature of 9.26 percent by weight silver nitrate in distilled water was dispersed by single jet techniques over 25 minutes at a rate of 88 grams per minute to a make pot containing a solution of 208 grams of 10 percent derivatized gelatin in distilled water, 139.1 grams potassium bromide, 28.6 grams potassium chloride, 12.0 grams 10% solution potassium iodide in distilled water and 907 grams distilled water. Make temperature was maintained at 62° C. and the pH of the mixture was observed to be 5.67. A 5 ml sample of the resultant emulsion was taken to which was added 1 mol of a 1 percent solution of 1-phenyl-5-mercaptotetrazole and 8 ml of a 15% by weight gelatin solution. The above sample provided data at a 0.600 mole percent iodide content level. Techniques in preparing some other samples varied but followed standard procedures and did not alter developed grain structure. For all samples, make temperatures were adjusted to strive for a 1 micron M.V.D.

Figure 11:
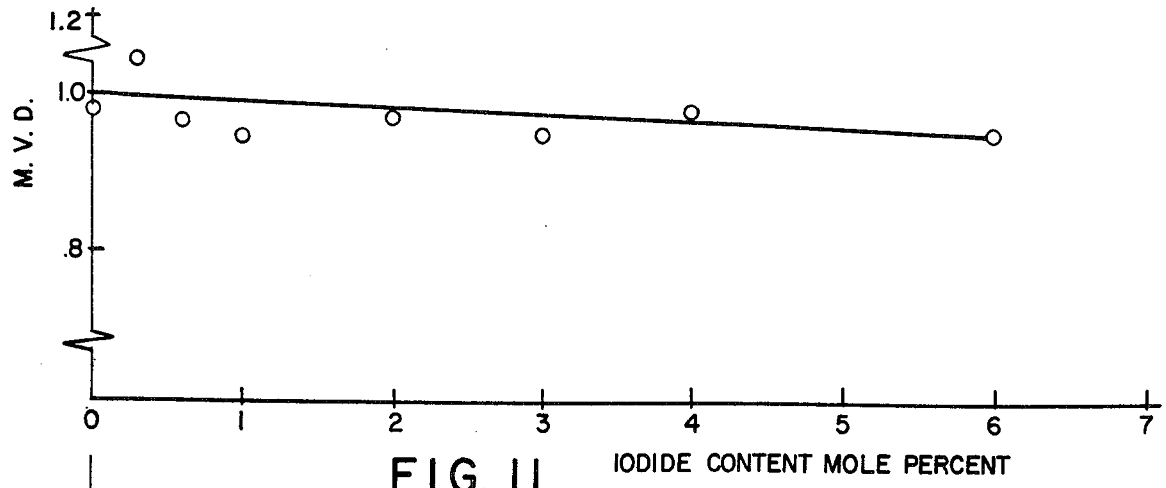
FIGS. 11–13 are curves relating iodide content respectively with Mean Volume Diameter, Standard Deviation and Coefficient of Variation for a series of silver halide samples having varying iodide content.
Figure 12:
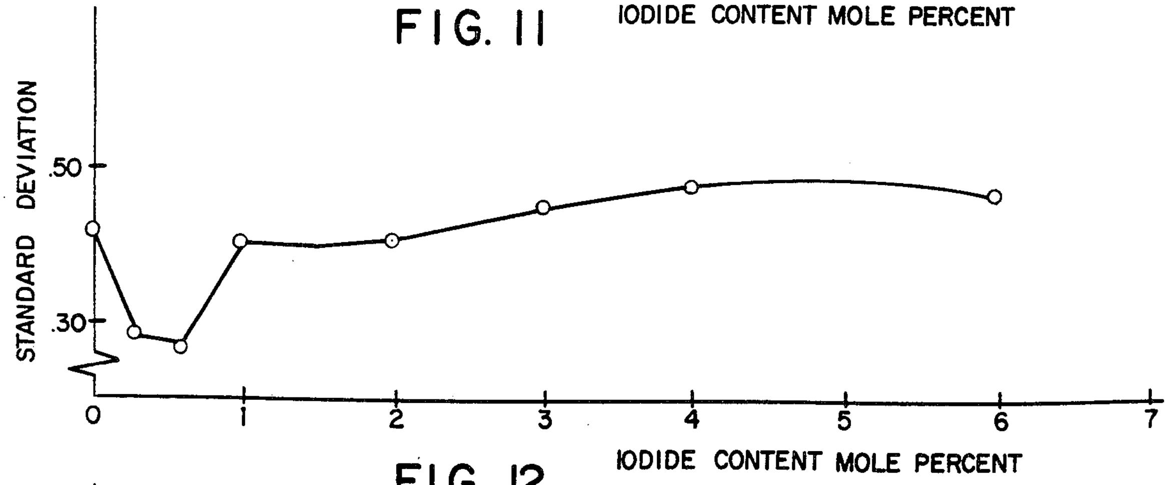
Figure 13:
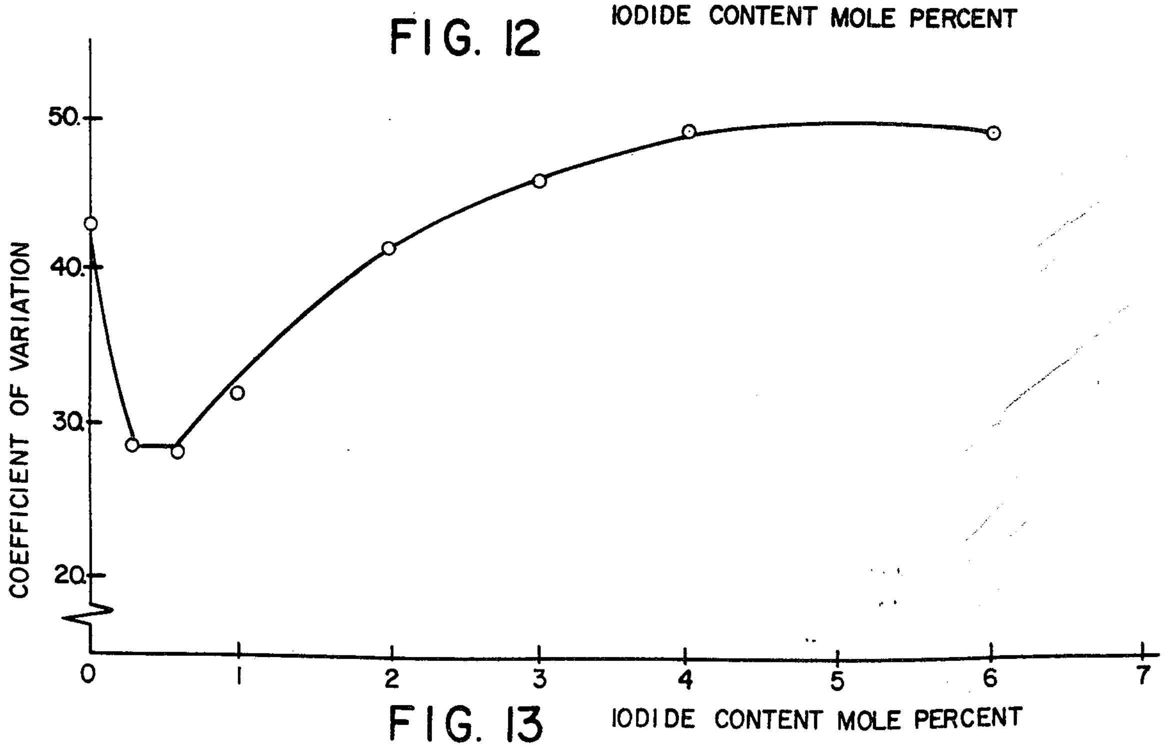

Upon analysis, as before utilizing the Coulter technique, data interrelaing Mean Volume Diameter, Standard Deviation, and Coefficient of Variation was derived and such data is plotted respectively in FIGS. 11, 12, and 13.

Figure 9:
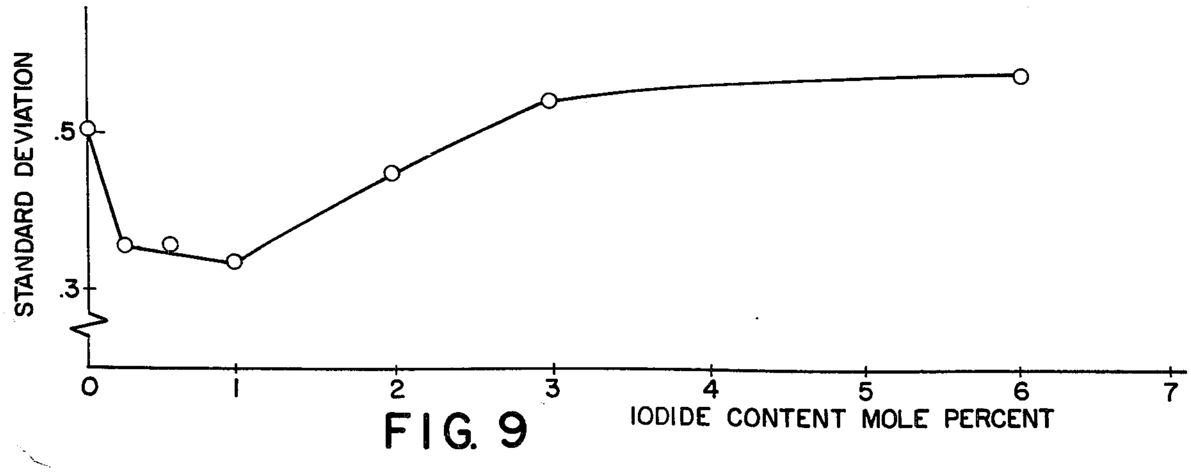

As in the case of the curve shape of FIG. 9, the shape of the Standard Deviation curve (FIG. 12) follows that of the corresponding Coefficient of Variation curve (FIG. 13). This results from the above-noted normalization of M.V.D. grain size to one micron.

Figure 10:
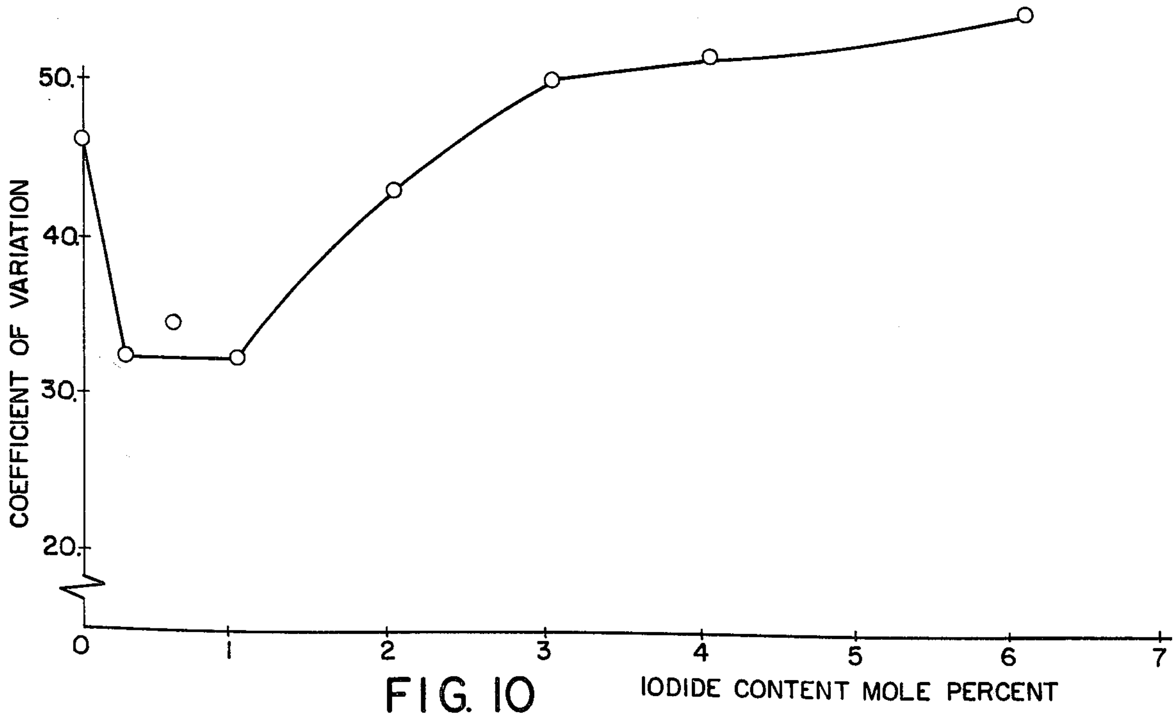

Looking to FIGS. 10 and 13, it may be observed that lowest values for the Coefficient of Variation occur within a region between about 0.3 and 1.0 mole percent iodide content. Further, the median low value for the Coefficient remained at about an iodide content of 0.625 mole percent. It may be seen, therefore, that the unique iodide content range deriving narrowest grain size distributions obtained universally for both iodobromide and tri-halide emulsion formulations.

As in the case of the iodobromide emulsions discussed above, a more comprehensive view of the noted region of interest is provided in Table II. The data in this tabulation represent the characteristics of a series of iodochlorobromide emulsions, prepared substantially as above, and formulated having progressively, incrementally varying iodide levels in combination with a 2 mole percent chloride content within the grains. As above, in addition to providing values relating Coefficient of Variation (C.V.) with iodide content, the tabulation reveals Make Temperature, Jet time and M.V.D. for each emulsion.

TABLE II

| Emulsion | Moles Fraction I | Make Temp | Jet Time | MVD Mic. | C.V. |
|---|---|---|---|---|---|
| 3348 | .000 | 51° C | 24.5′ | 1.025 | 40.490 |
| 3349 | .001 | 59° C | 24.1′ | 1.004 | 37.434 |
| 3350 | .002 | 60° C | 24.6′ | .981 | 34.992 |
| 3351 | .003 | 61° C | 24.5′ | .990 | 29.810 |
| 3352 | .004 | 61° C | 24.0′ | .974 | 26.072 |
| 3353 | .005 | 62° C | 25.2′ | .986 | 26.908 |
| 3354 | .006 | 62° C | 24.6′ | .967 | 27.755 |
| 3347 | .00625 | 62° C | 24.7′ | .962 | 27.104 |
| 3355 | .00625 | 62° C | 25.5′ | .958 | 26.385 |
| 3356 | .007 | 63° C | 25.0′ | .941 | 27.699 |
| 3357 | .008 | 65° C | 25.1′ | 1.000 | 27.672 |
| 3358 | .009 | 66° C | 25.0′ | 1.038 | 30.687 |
| 3359 | .010 | 66° C | 24.9′ | .996 | 29.980 |
| 3360 | .011 | 66° C | 25.0′ | .972 | 33.626 |
| 3361 | .012 | 67° C | 24.8′ | 1.038 | 33.976 |
| 3362 | .013 | 67° C | 25.1′ | 1.021 | 35.442 |
| 3364 | .014 | 67° C | 24.9′ | 1.069 | 34.652 |
| 3365 | .015 | 68° C | 24.8′ | 1.041 | 36.068 |
| 3366 | .016 | 68° C | 25.2′ | 1.005 | 39.202 |
| 3367 | .017 | 68° C | 24.8′ | 1.029 | 36.130 |
| 3368 | .018 | 69° C | 25.0′ | 1.049 | 39.218 |
| 3369 | .019 | 69° C | 24.7′ | 1.075 | 38.080 |
| 3370 | .020 | 69° C | 24.9′ | 1.052 | 38.444 |

Similar to the data of Table I, the data of Table II shows that for Coefficients of Variation of about 30% and below, the iodide content ranges beteen about 0.3 to 1.0 mole %. Considering Tables I and II together, a desirable iodide range is 0.6% ± 0.3 mole %, minimum C.V. values being achieved between about 0.4 to 0.8 mole percent iodide.

Figure 14:
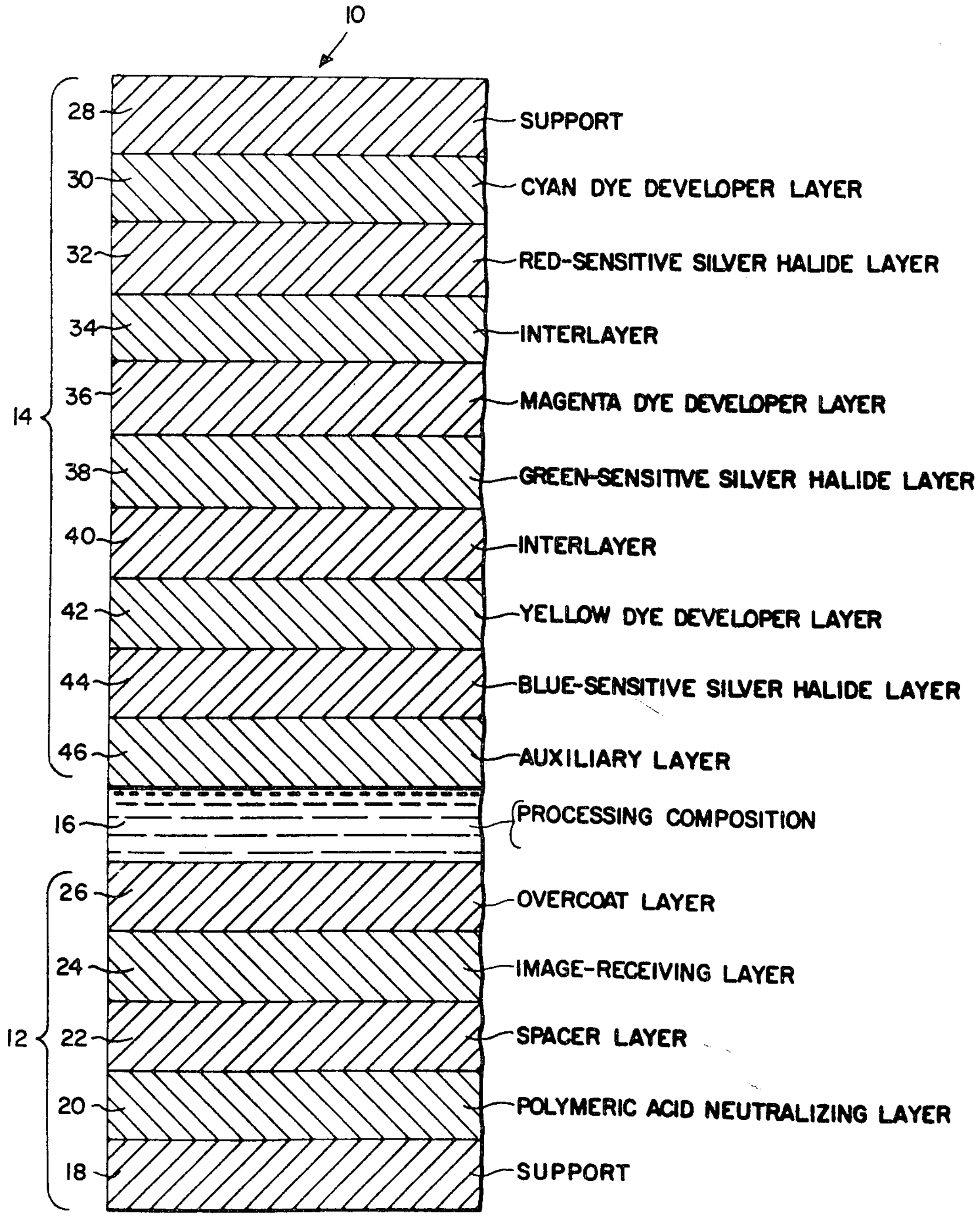
FIG. 14 is a cross-section of one film unit embodiment for the present invention.

One embodiment for a film unit structure incorporating a photographic emulsion having an iodide content selected to derive a grain size distribution evidencing a relatively low Coefficient of Variation as above described is illustrated in connection with FIG. 14. The film unit structure of that figure is one wherein the photosensitive element and image-receiving element are separated subsequent to substantial transfer image formation as exemplified in previously mentioned U.S. Pat. No. 2,983,606. Looking to FIG. 14, the film unit, shown generally at 10, comprises an image receiving element 12 and a photosensitive element 14. Elements 12 and 14 are shown in the drawing in superposed relationship as they would be positioned subsequent to the exposure of photosensitive element 14 and at such time as a liquid processing composition, as shown at 16, would be interposed therebetween from a rupturable container or the like.

Image receiving element 12 may comprise a plurality of layers coated on a polymeric suppot 18 including a polymeric acid neutralizing layer 20, a polymeric spacer layer 22, an image-receiving layer 24 and an auxiliary or overcoat layer 26.

The multicolor, multilayer photosensitive element 14 may comprise a support 28 carrying a red-sensitive silver halide emulsion layer 32, a green-sensitive silver halide emulsion layer 38, and a blue-sensitive silver halide emulsion layer 44. These layers are formed of emulsions formulated in accordance with the iodide content teachings of the instant invention. The emulsion layers may have positioned behind them and contained in layers 30, 36, and 42, respectively, a cyan dye developer, a magenta dye developer and a yellow dye developer. Interlayers 34 and 40, respectively, may be positioned between the yellow dye developer layer and the green-sensitive emulsion layer and between the magenta dye developer layer and the red-sensitive emulsion layer. An auxiliary layer 46 also may be included as the outermost surface of the photosensitive element 14.

In the performance of a diffusion transfer multicolor process embodying film unit 10, photosensitive element 14 thereof is exposed to radiation actinic thereto. Subsequent to this exposure, image-receiving element 12 is superposed with photosensitive element 14 in appropriate position with respect to a rupturable container holding a given quantity of processing composition. The assembly is then passed through oppositely disposed rolls or the like which apply compressive pressure to the rupturable container to effect the distribution of the alkaline processing composition therein having a pH at which the cyan, magenta, and yellow dye developers are soluble and diffusible, intermediate overcoat layer 26 and auxiliary layer 46.

Alkaline processing solution 16 permeatesemulsion layers 44, 38, and 32 to initiate development of the latent images contained therein. The cyan, magenta and yellow dye developers of layers 30, 36, and 42, respectively, are immobilized as a function of the development of their respective associated silver halide emulsions, preferably substantially as a result of their conversion from the reduced form to the relatively insoluble and nondiffusible oxidized form, thereby providing imagewise distributions of mobile, soluble and diffusible cyan, magenta and yellow dye developer as a function of the point-to-point degree of their associated emulsions' exposure. At least part of the imagewise distribution of mobile cyan, magenta and yellow dye developer transfers, by diffusion, through the overcoat layer 26 to aqueous alkaline solution permeable image-receiving layer 24 to provide a multicolor dye transfer image to that layer. In the embodiment shown, subsequent to substantial transfer image formation, a sufficient portion of the ions comprising aqueous alkaline solution 16 transfers, by diffusion, through the aforementioned layers 26 and 24 and through permeable spacer layer 22 to the permeable polymeric acid layer 20 whereupon alkaline solution 16 decreases in pH, as a function of neutralization, as described in U.S. Pat. No. 3,362,819. The resulting image may be viewed, following processing, by separation of the receiving element 12 from the photosensitive element 14.

A film unit similar to that described in connection with FIG. 14 was prepared as follows:

An image-receiving element was prepared by coating the following layers on a cellulose acetate-butyrate subcoated baryta paper support, said layers respectively comprising the following major ingredients:

1. a mixture of about 8 parts, by weight, of a partial butyl ester of polyethylene/maleic anhydride and about 1 part, by weight, of polyvinyl butyral resin (Butvar ®, Shawinigan Products, New York, New York) to form a polymeric acid layer approximately 0.6 to 0.9 mils thick;
2. a mixture of about 7 parts, by weight, of hydroxypropyl cellulose (Klucel ®, J12HB, Hercules, Inc., Wilmington, Delaware), and about 4 parts, by weight, of polyvinyl alcohol; to form a spacer layer approximately 0.30 to 0.37 mils thick; and
3. a mixture of about 2 parts of polyvinyl alcohol and 1 part of poly-4-vinylpyridine to form an image-receiving layer approximately 0.35 to 0.45 mils thick, also containing an equimolar mixture of the cis- and trans-isomers of 4,5-cyclopentahexahydropyrimidine-2-thione (described in copending application Ser. No. 214,665, filed Jan. 3, 1972, now U.S. Pat. No. 3,785,813 issued Jan. 15, 1974) as a development restraining reagent, and hardened by a condensate of acrolein and formaldehyde; and
4. a 3:2 mixture by weight of ammonium hydroxide and gum arabic coated at a coverage of about 25 mgs./ft.$^2$ of total solids to form a thin overcoat layer about 0.1 to 0.5 mils thick.

A photosensitive element was prepared by coating an opaque polyester film base with the following layers:

1. a layer comprising the cyan dye developer:

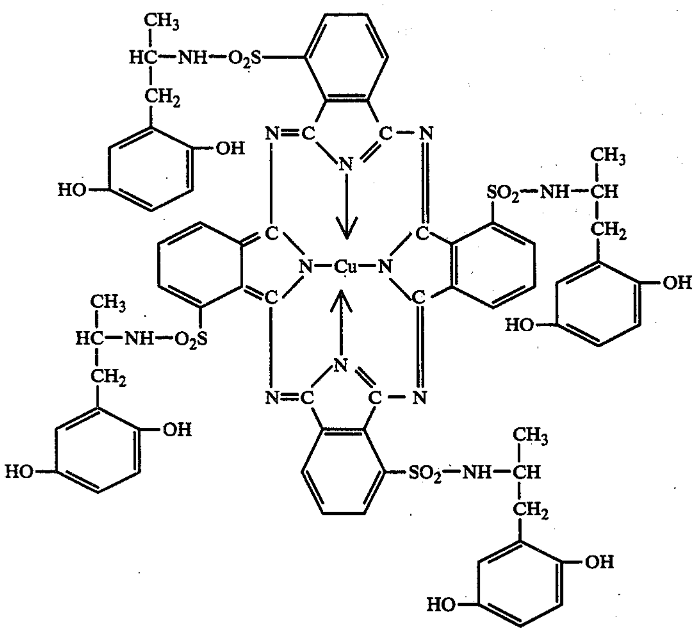

dispersed in gelatin and coated at a coverage of about 69 mgs./ft.$^2$ of dye, about 98 mgs./ft.$^2$ of gelatin, and 10 mgs./ft.$^2$ 4'-methylphenyl hydroquinone;

2. a red-sensitive gelatino silver iodobromide emulsion layer having a 0.625 mole percent iodide content and coated at a coverage of about 140 mgs./ft.$^2$ of silver and about 61 mgs./ft.$^2$ of gelatin;

3. an interlayer of a 60/30/4/6 tetrapolymer of butylacrylate, diacetone acrylamide, styrene and methacrylic acid, plus about 2.4% by weight of polyacrylamide permeator, coated at about 264 mgs./ft.$^2$ of total solids;

4. a layer comprising the magenta dye developer:

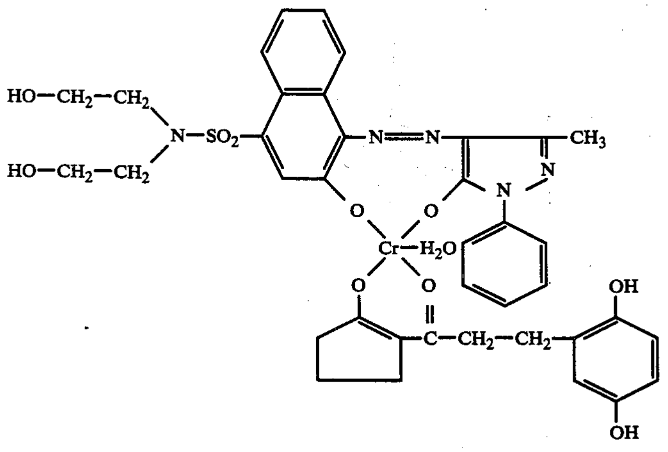

dispersed in gelatin and coated at a coverage of about 75 mgs./ft.$^2$ of dye and about 66 mgs./ft.$^2$ of gelatin;

5. a green-sensitive gelatino silver iodobromide emulsion layer having a 0.625 mole percent iodide content and coated at a coverage of about 80 mgs./ft.$^2$ of silver and about 85 mgs./ft.$^2$ of gelatin;

6. a layer containing the tetrapolymer referred to above in layer 3 plus about 7.8% polyacrylamide coated at about 107 mgs./ft.$^2$ of total solids; and also containing succindialdehyde at about 9.8 mgs./ft.$^2$;

7. a layer comprising the yellow dye developer:

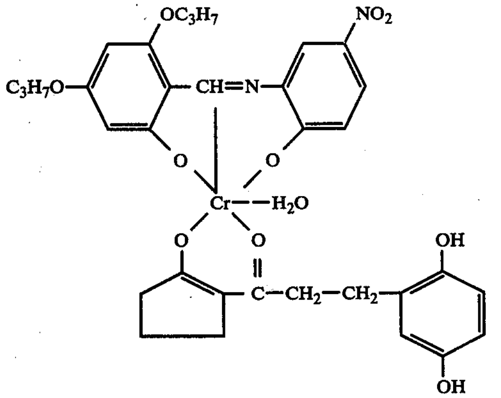

dispersed in gelatin and coated at a coverage of about 75 mgs./ft.$^2$ of dye and about 58 mgs./ft.$^2$ of gelatin;

8. a blue-sensitive gelatino silver iodobromide emulsion having a 0.625 mole percent iodide content and coated at a coverage of about 96 mgs./ft.$^2$ of silver and about 53 mgs./ft.$^2$ of gelatin, plus about 25 mgs./ft.$^2$ of 4'-methylphenylhydroquinone and 34 mgs./ft.$^2$ of gelatin;

9. a gelatin overcoat layer coated at a coverage of about 30 mgs./ft.$^2$ of gelatin.

A rupturable container comprising an outer layer of lead foil and an inner liner or layer of polyvinyl chloride retaining an aqueous alkaline solution comprising the following formulation (percent by weight):

| | |
|---|---|
| Potassium Hydroxide | 7.2 |
| Benzotriazole | 1.25 |
| 6-bromo-5-methyl-4-azabenzimidazole | 0.33 |
| methyl thiouracil | 1.7 |
| zinc nitrate | 0.42 |
| phenethyl-α-picolinium bromide | 0.83 |
| benzyl-α-picolinium bromide | 1.16 |
| hydroxyethyl cellulose (Natrasol 250 MBR Med. M.W.) | 2.25 |
| Titanium dioxide | .42 |
| bis-β-aminoethylsulfide | 0.066 |
| Water | 84.15 |

was affixed to the leading edge of the film unit such that upon application of compressive pressure to the container, its contents were distributed, upon rupture of the container's marginal seal, between the surface layers of the photosensitive and receiving elements.

A comparison of the performance of photosensitive elements generally structured as above incorporating iodobromide dispersions having a 0.625 mole percent iodide content with elements having iodobromide dispersions having a 2.0 mole percent iodide content is provided in the data to follow. The data represents an analysis of a typical diffusion transfer characteristic curve in which measured values of sample densities are plotted against corresponding wedge density values. Presented as the mean of several samplings, the tabulation includes values for "DMIN," representing minimum plotted density value for a given color; "SLOPE," representing gamma or the slope defined between sample density values of 1.05 and 0.55; "60INT," representing a speed valuation measured at the 0.6 sample density intercept of the curve; and "TOEXT," representing the extent of the wedge density portion of the curve between those points of the curve exhibiting a slope of 1.00 and a slope of 0.20.

Note from the data that higher speed as well as advantageous lower slope is present in the evaluation of the red recordation. Similar advantageous reductions in SLOPE or gamma are present in the analysis of the green and blue responses. The toe extent data for the latter green and blue analysis show an advantageous enlargement.

| 0.625 MOLE PERCENT IODIDE CONTENT | | | |
|---|---|---|---|
| | Red | Green | Blue |
| DMAX | 1.697 | 2.187 | 2.122 |
| DMIN | 0.131 | 0.178 | 0.211 |
| SLOPE | 2.004 | 1.991 | 1.867 |
| 60INT | 1.415 | 1.366 | 1.351 |
| TOEXT | 0.302 | 0.339 | 0.353 |
| 2.0 MOLE PERCENT IODIDE CONTENT | | | |
| | Red | Green | Blue |
| DMAX | 1.826 | 2.202 | 2.007 |
| DMIN | 0.134 | 0.174 | 0.214 |
| SLOPE | 2.329 | 2.280 | 1.943 |
| 60INT | 1.280 | 1.361 | 1.386 |
| TOEXT | 0.297 | 0.240 | 0.299 |

Figure 17:
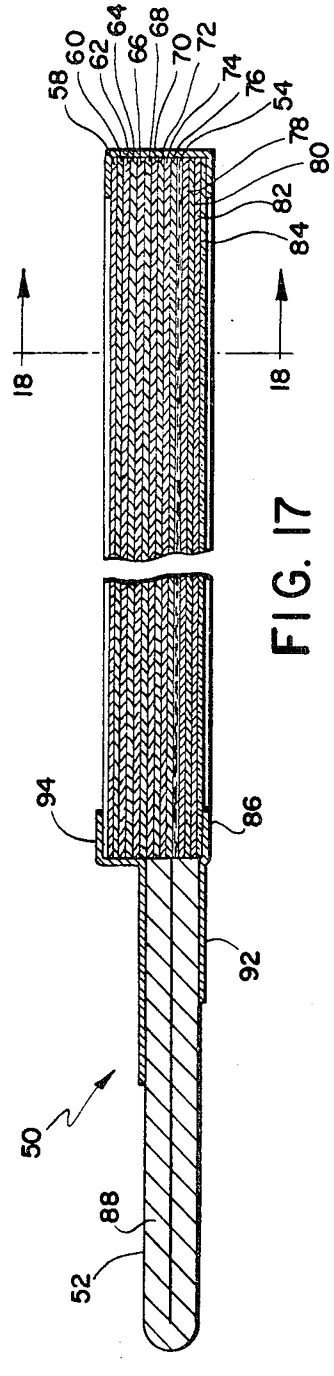
FIGS. 17 and 18 are enlarged exaggerated cross-sectional views of the embodiment of FIGS. 15 and 16 showing the association of compoents subsequent to processing thereof.
Figure 18:
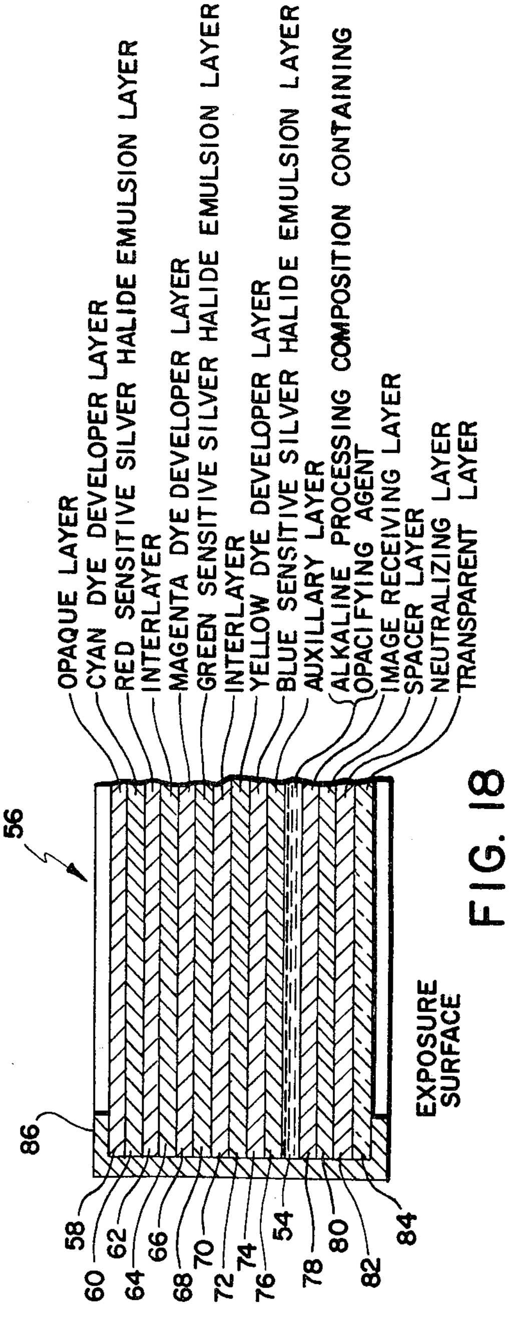
Figure 19:
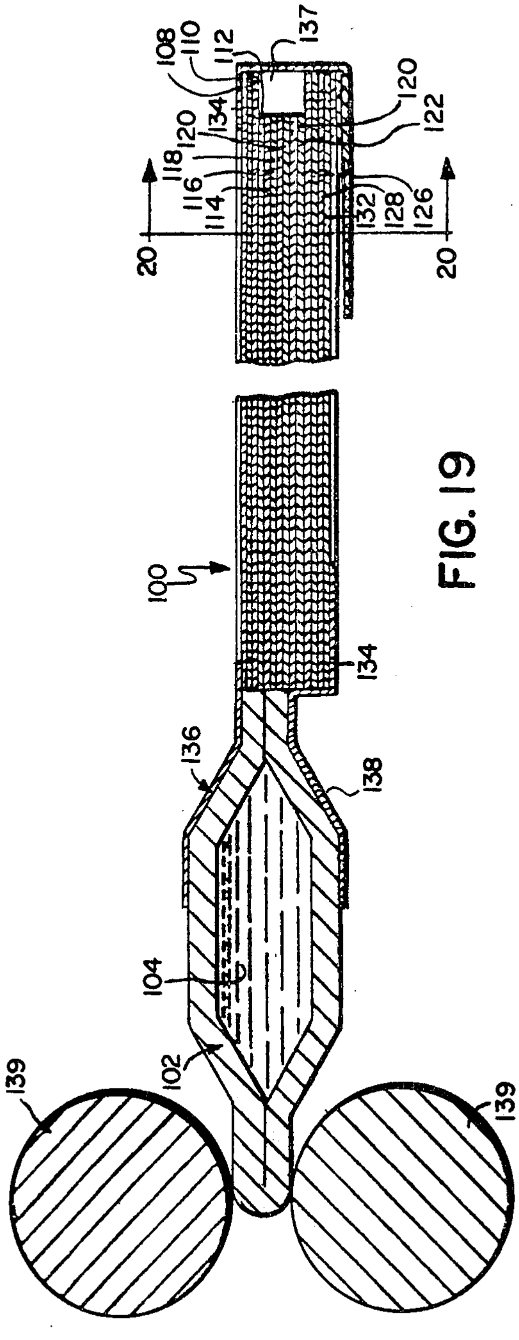
FIGS. 19 and 20 show, in exaggerated scale, still another embodiment of a film unit according to the present invention, the Figures showing the compoents of the film unit as they exist prior to processing thereof.
Figure 20:
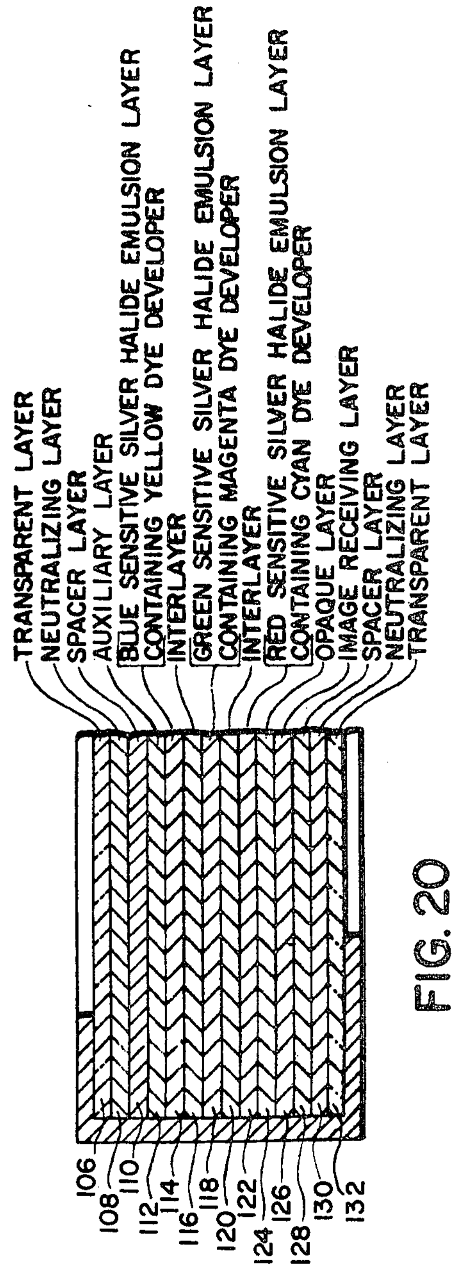
Figure 21:
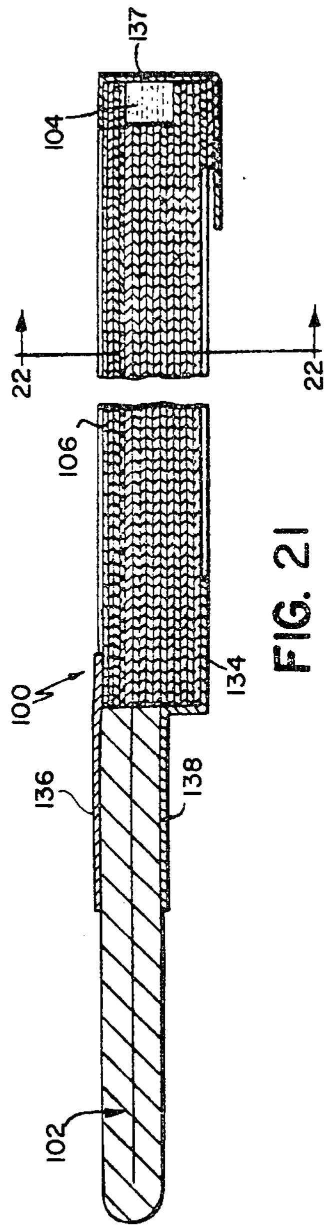
FIGS. 21 and 22 show the post processing orientation of the film unit embodiment of FIGS. 19 and 20.
Figure 22:
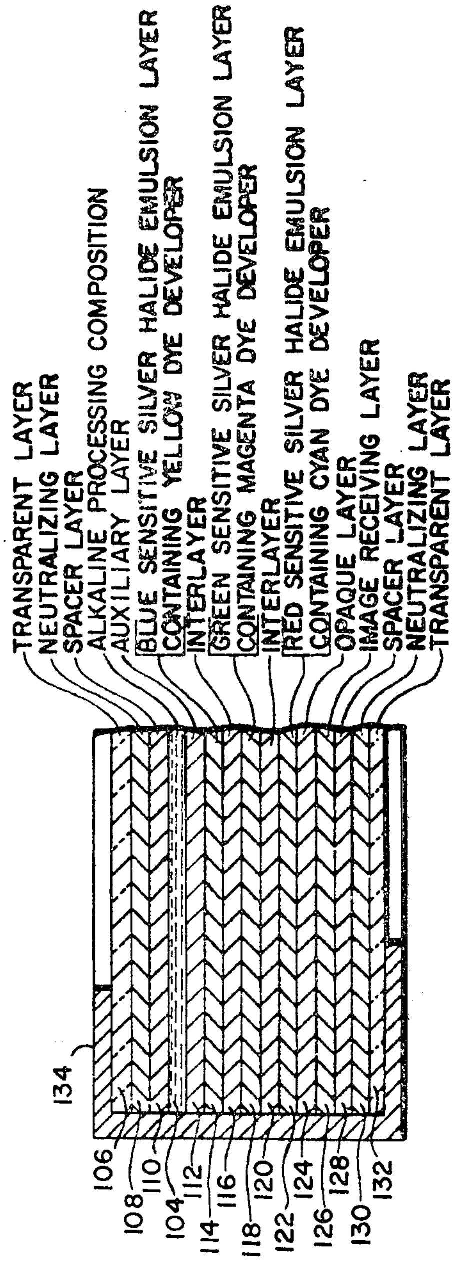

Film structures according to the prevent invention also may take on an integral form wherein the photosensitive element as well as receiving structure are permanently superposed, the rupturable container retaining processing composition being fixedly combined with the composite arrangement. One such structure is illustrated in connection with FIG. 15–18, FIGS. 16 and 18 representing transverse sections, respectively, of film units 15 and and 17 and the latter figures representing longitudinal sections of a film unit. As is apparent, all the figures are shown in greatly exaggerated scale, FIGS. 15 and 16 revealing a cross section of the film unit prior to processing, while FIGS. 17 and 18 show the geometry of the film unit as it exists subsequent to processing.

Film unit 50 comprises a rupturable container 52, retaining prior to processing, aqueous proessing composition 54, and a photosensitive laminate 56 including, in order, dimensionally stable opaque layer 58, preferably an actinic radiation-opaque flexible sheet material; cyan dye developer layer 60; red-sensitive silver halide emulsion layer 62; interlayer 64; magenta dye developer layer 66; green-sensitive silver halide emulsion layer 68; interlayer 70; yellow dye developer layer 72; blue-sensitive layer halide emulsion layer 74; auxiliary layer 76, which may contain an auxiliary silver halide developing agent; image-receiving layer 78; spacer layer 80; neutralizing layer 82; and a dimensionally stable transparent layer 84, preferably an actinic radiation transmissive flexible sheet material.

The structural integrity of laminate 56 may be maintained, at least in part, by the adhesive capacity exhibited between the various layers comprising the laminate at their opposed surfaces. However, the adhesive capacity exhibited at an interface intermediate image-receiving layer 78 and the silver halide emulsion layer next adjacent thereto, for example, image-receiving layer 78 and auxiliary layer 76 should be less than that exhibited at the interface between the opposed surfaces of the remainder of the layers forming the laminate, in order to facilitate the distribution of processing solution 54 along the noted interface. The laminates structural integrity also may be enhanced or provided, in whole or in part, by providing a binding member extending around, for example, the edges of laminate 56, and maintaining the layers comprising the laminate intact, except at the interface between layers 76 and 78 during distribution of processing composition 54 intermediate those layers. The binding member may comprise a pressure-sensitive tape 86 securing and/or maintaining the layers of laminate 56 together at its respective edges. Tape 86 also will act to maintain processing solution 54 intermediate image receiving layer 78 and the silver halide emulsion layer next adjacent thereto upon application of compressive pressure to pod 52 and distribution of its contents intermediate the stated layers. Under such circumstances, binder tape 86 will act to prevent leakage of fluid processing composition from the film units laminate during and subsequent to the photographic process.

Rupturable container 52, as in other film units of this invention, may be of the type shown and described in any of U.S. Pat. Nos. 2,543,181; 2,634,886; 3,653,732; 2,723,051; 3,056,492; 3,056,491; 3,152,515 and the like. In general, such containers will comprise a rectangular blank of fluid and air-impervious sheet material folded longitudinally upon itself to form two walls 88 which are sealed to one another along their longitudinal and end margins to form a cavity in which processing composition 54 is retained. The longitudinal marginal seal 90 is made weaker than the end seals so as to become unsealed in response to the hydraulic pressure generated within the fluid contents 54 of the container by the application of the compressive pressure to walls 88.

Container 54 is fixedly positioned and extends transverse the leading edge of photosensitive laminate 56 whereby to effect uni-directional discharge of the containers contents 54 between image-receiving layer 78 and the stated layer next adjacent thereto, upon application of compressive force to container 52. The container 52 is fixedly secured to laminate 56 by an extension 92 of tape 86 extending over a portion of one wall 88, in combination with a separate retaining member such as retaining tape 94 extending over a portion of the laminate 56 surface. Depending upon the particuar film unit structure desired, container 52 may remain with the film unit 50 permanently or may be remoed following processing, whereupon tape extension 92 is utilized tosecure the lading edge of the film unit.

The fluid contents of the container preferably comprise an aqueous alkaline solution having a pH and solvent concentration in which the dye developers are soluble and diffusible and contains inoganic light-reflecting pigment and at least one optical filter agent at a pH above the pKa of such agent in quantities sufficient upon distribution, effective to provide a layer exhibiting an optical transmission density greater than about 6.0 and optical reflection density less than about 1.0 to prevent exposure of photosensitive silver halide emulsion layers 62, 68 and 74 by actinic radiation incident on dimensionally stable transparent layer 84 during processing in the presence of such radiation and to afford immediate viewing of dye image formation and image-receiving layer 78 during and subsequent to dye transfer image formation. Accordingly, the film unit may be processed, subsequent to distribution of the composition, in the presence of such radiation, in view of the fact that the silver halide emulsion or emulsions of the laminate are appropriately protected from incident radiation at one major surface by the opaque processing compositionn and at the remaining major surface by the dimensionally stable opaque layer. If the illustrated binder tapes also are opaque, edge leakage of actinic radiation incident on the emulsion or emulsions will also be prevented.

The selected reflecting pigment should be one providing a background suitable for viewing the dye developer transfer image formed in the dyeable polymeric layer. In general, while substantially any reflecting agent may be employed, it is preferred that a reflecting agent be selected that will not interfere with the color integrity of the dye transfer image, as viewed by the observer, and, most preferably, an agent which is aesthetically pleasing to the viewer and does not provide a background noise signal degrading, or detracting from, the information content of the image. Particularly desirable reflecting agents will be those providing a white background, for viewing the transfer image, and specifically those conventionally employed to provide background for reflection photographic prints and, especially those agents possessing the optical properties desired for reflection of incident radiation.

A particularly preferred reflecting agent comprises titanium dioxide due to its highly effective reflection properties. In general, in such preferred embodiment, based upon percent titanium dioxide (weight/volume) a processing composition containing about 1500 to 400 mgs./ft.$^2$ titanium dioxide dispersed in 100 cc. of water will provide a percent reflectance of about 85 to 90%. In the most preferred embodiments, the percent reflectance particularly desired will be in the order of $>\sim 85\%$.

In embodiments wherein the dispersion comprises a preformed layer positioned intermediate the reception layer and next adjacent silver halide layer, the pigment layer will be sufficiently transparent to allow transit of exposing radiation through the pigment layer and may comprise titanium dioxide reflecting agent possessing a particle size distribution averaging $<\sim 0.2$ micron in diameter and preferably $<\sim 0.05$ micron in diameter as initially present preceding exposure of the film unit, which preferred materials, upon conact with aqueous alkaline processing composition, preferably aggregate to provide particles possessing a diameter $>\sim 0.2$ micron in diameter and will be coated at a coverage of $\sim 200$ to 1000 mgs./ft.$^2$ . Specifically, the reflecting agent will be present in a quantity insufficient to prevent exposure of the emulsion layers by actinic radiation incident on the dimensionally stable transparent layer of the film unit but in a concentration sufficient, subsequent to processing, to mask dye developer associated with the silver halide emulsion strata from the dye transfer image. In the preferred construction of such embodiment, the pigment such as titanium dioxide will be initially present in a relatively small particle size to provide efficient transit of radiation through the reflecting layer during exposure, and which upon contact with an alkaline processing composition and aggregation of the pigment particles provides efficient light reflectivity and masking capacity subsequent to such aggregation.

The optical filter agent selected should be one exhibiting, at a pH above its pKa, maximum spectral absorption of radiation at the wavelengths to which the film unit's photosensitive silver halide layer or layers are sensitive and should be substantialy immobile or nondiffusible within the pigment dispersion, during performance of its radiation filtration function, in order to maintain and enhance the optical integrity of the dispersion as a radiation filter unit, and to prevent its diffusion into the localized concentration within the image-receiving layer thereby decreasing the efficiency of the reflecting pigment dispersion as a background against which image formation may be immediately viewed, during the initial stages in the diffusion transfer processing of the film unit, by filter agent absorption of visible radiation prior to reduction in the environmental pH below the pKa of the agent. Commensurate with the spectral sensitivity range of th associated silver halide layer or layers, the optical filter agent selected may comprise one or more filter dyes possessing absorption complementary to such silver halide layers in order to provide effective protection against fog providing radiation during processing. Recognizing that the filter agent absorption will derogate from image-viewing characteristics by contaminating reflecting pigment background, the selected agents should be those exhibiting major spectral absorption at the pH at which processing is effected and minimal absorption at a pH below that which obtains during transfer image formation. Accordingly, the selected optical filer agent or agents should possess a pKa below that of the processing pH and above that of the environmental pH subsequent to transfer image formation and will be preferably selected for employment in the minimum concentration necessary to provide an optical transmission density $> \sim 6.0$, at wavelengths at which the silver halide layer is maximally responsive, and an optical reflection density $< \sim 1.0$ at such wavelengths.

As specific examles of such pH-sensitive optical filter agents adapted for employment in the practice of the present invention, reference is directed to the agents set forth in U.S. Pat. No. 3,647,437 incorporated herein by reference.

As disclosed in the previously cited patents, the liquid processing composition referred to for effecting multicolor diffusion transfer processes comprises at least an aqueous solution of an alkaline material, for example, sodium or potassium hydroxide, and the like, and preferably possessing a pH in excess of 12, and most preferably includes a viscosity-increasing compound constituting a film-forming material of the type which, when the composition is spread and dried, forms a relatively firm and relatively stable film. The preferred film-forming materials disclosed comprise high molecular weight polymers such as polymeric, water-soluble ethers which are inert to an alkaline solution such as, for example, a hydroxyethyl cellulose, hydroxyethyl carboxymethyl cellulose, or sodium carboxymethyl cellulose. Other film-forming materials or thickening agents whose ability to increase viscosity is substantially unaffected if left in solution for a long period of time are also capable of utilization. As stated, the film-forming material is preferably contained in the processing composition in such suitable quantities as to impart to the composition a viscosity in excess of 100 cps. at a temperature of approximately 24° C. and preferably in the order of 100,000 cps. to 200,000 cps. at that temperature.

In the performance of diffusion transfer multi-color process employing film unit 50, the unit is exposed to radiation actinic to photosensitive laminate 56 incident on the laminate's exposure surface.

Figure 15:
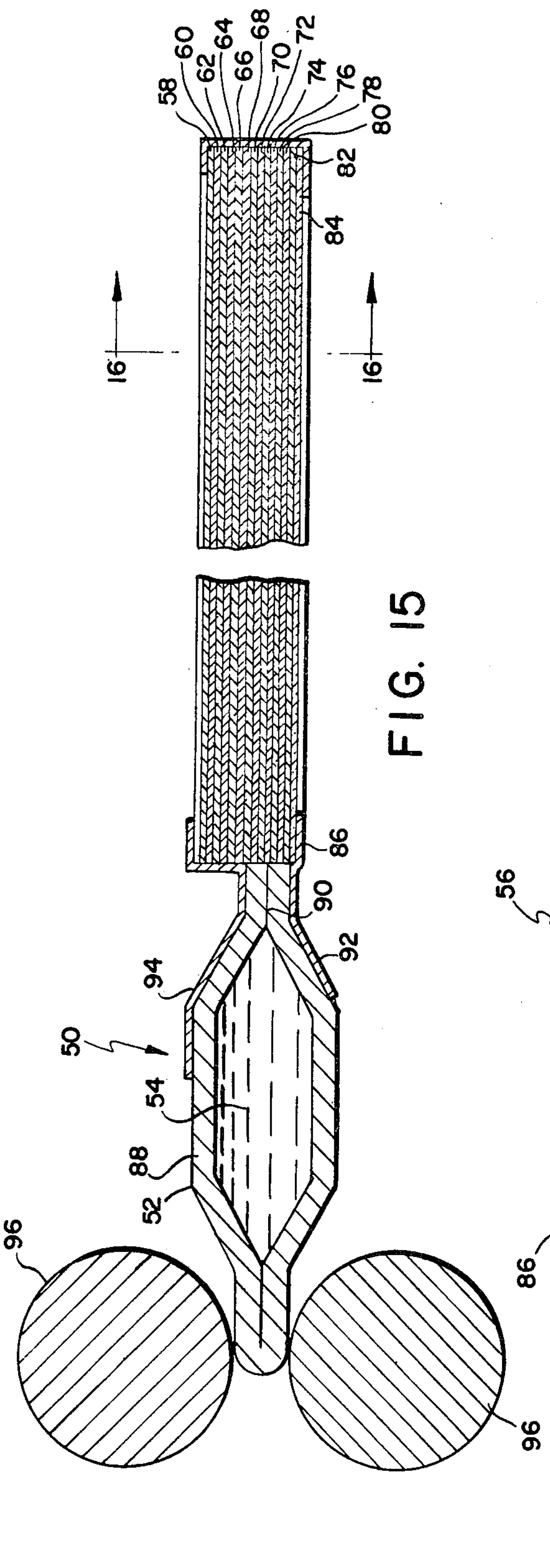
FIGS. 15 and 16 are enlarged and exaggerated representations of another film unit embodiment of the present invention prior to the processing thereof.
Figure 16:
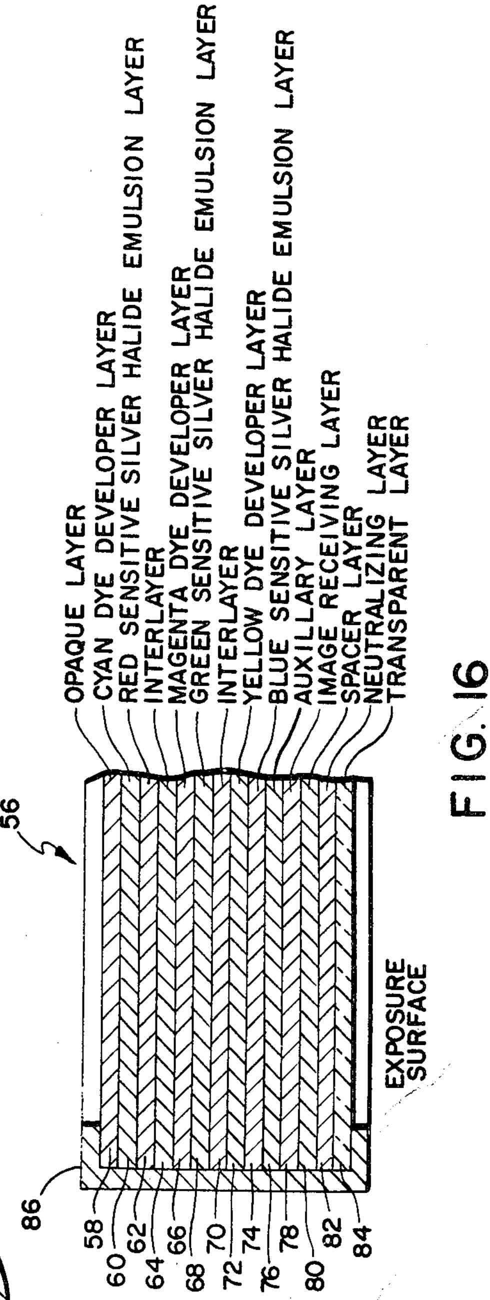

Subsequent to this exposure, as illustrated in FIGS. 15 and 17, film unit 50 is processed by being passed through opposed suitably gapped rolls 96 in order to apply compressive pressure to frangible container 52 and to effect rupture of its longitudinal seal and the consequent distribution of alkaline processing composition 54, possessing inorganic light-reflecting pigment and optical filter agent at a pH above the pKa of the filter agent and the pH at which the cyan, magenta and yellow dye developers are soluble and diffusible as a function of the point-to-point degree of exposure of red-sensitive silver halide emulsion layer 62, green-sensitive silver halide emulsion layer 68 and blue-sensitive silver halide emulsion layer 74, respectively, intermediate reflecting agent precursor layer 78 and auxiliary layer 76.

Alkaline processing composition 54 permeates emulsion layers 62, 68 and 74 to initiate development of the latent images contained in the respective emulsions. The cyan, magenta and yellow dye developers of layers 60, 66 and 72, are immobilized, as a function of the development of their respective associated silver halide emulsions, thereby providing imagewise distributions of mobile, soluble and diffusible cyan, magenta and yellow dye developers, as a function of the point-to-point degree of their associated emulsions exposure. At least part of the imagewise distributions of mobile cyan, magenta and yellow dye developer transfers by diffusion to dyeable polymeric layer 78 to provide a multicolor dye transfer image to that layer which is viewable against the background provided by the reflecting pigment present in processing composition residuum 54 masking cyan, magenta and yellow dye developer remaining associated with blue-sensitive emulsion layer 74, green-sensitive emulsion layer 68 and red-sensitive emulsion layer 62. Subsequent to substantial transfer image-formation, a sufficient portion of the alkaline ions transfer, by diffusion, through permeable polymeric reception layer 78, permeable spacer layer 80 to polymeric neutralizing layer 82 whereby the environmental pH of the system decreases as a function of neutralization to a pH at which the cyan; magenta and yellow dye developers, in the reduced form, are substantially non-diffusible to thereby provide a stable multicolor dye transfer image. Discharge of the pH-sensitive optical filter agent by reduction of pH substantially below the pKa of said agent provides maximum reflectivity of the light-reflecting pigment layer.

The film structure illustrated in connection with FIGS. 15–18 will be further illustrated and detailed in conjunction with the following illustrative construction which sets out another representative embodiment of the novel photographic film units of this invention, which are intended to be illustrative only.

Film units having a laminar configuration suited for exposure and processing in similar fashion as that shown in FIGS. 15–18 in the drawings were prepared, for example, by coating, on a 4 mil. opaque polyester film base, the following layers:

1. a layer of the cyan dye developer

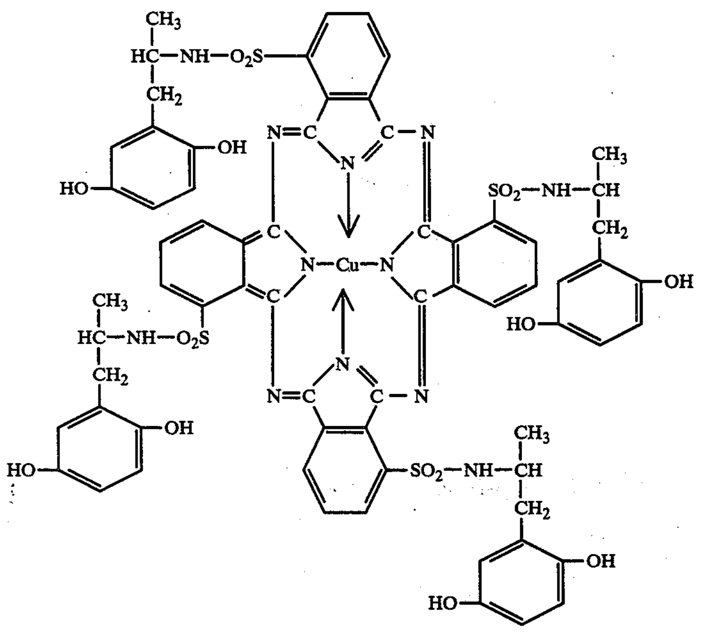

dispersed in gelatin and coated at a coverage of ~48 mgs./ft.$^2$ of dye and ~92 mgs./ft.$_2$ of gelatin;

2. a red-sensitive gelatino-silver bromide emulsion having a 0.625 mole percent iodide content coated at a coverage of ~95 mgs./ft.$^2$ of silver and ~27 mgs./ft.$^2$ of gelatin;

3. a layer of butyl acrylate/diacetone acrylamide/-styrene/methacrylic acid (60/30/4/6) and polyacrylamide coated in a ratio of ~29:1, respectively, at a coverage of ~264 mgs./ft.$^2$;

4. a layer of the magenta dye developer

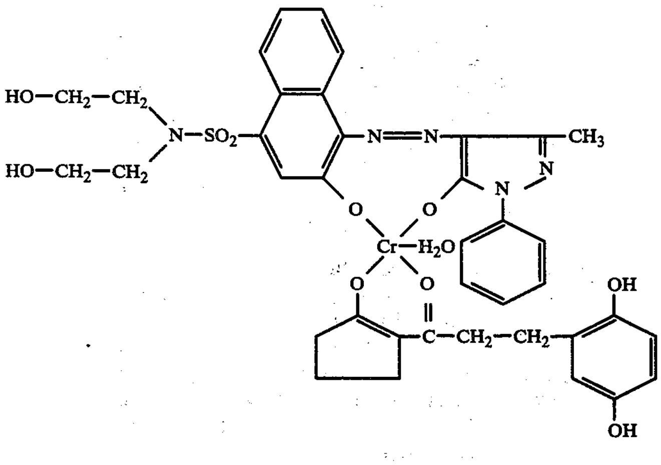

dispersed in gelatin and coated at a coverage of 62.4 mgs./ft.$^2$ of dye and ~50 mgs./ft.$^2$ of gelatin;

5. a green sensitive gelatino-silver iodobromide emulsion coated at a coverage of ~70 mgs./ft.$^2$ of silver and 40 mgs./ft.$^2$ of gelatin;

6. a layer comprising butyl acrylate/diacetone acrylamide/styrene/methacrylic acid (60/30/4/6) and polyacrylamide coated in a ratio of about 29:4, respectively, at a coverage of ~60 mgs./ft.$^2$ and ~10 mgs./ft.$^2$ succindialdehyde;

7. a layer of the yellow dye developer

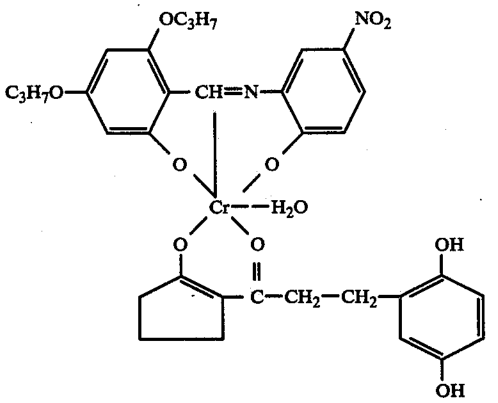

and the auxiliary developer 4'-methylphenyl hydroquinone dispersed in gelatin and coated at a coverage of ~100 mgs./ft.$^2$ of dye, ~15 mgs./ft.$^2$ of auxiliary developer and 54 mgs./ft.$^2$ of gelatin;

8. a blue-sensitive gelatino-silver iodobromide emulsion having a 0.625 mole percent iodide content coated at a coverage of ~125 mgs./ft.$^2$ of silver and ~33 mgs./ft.$^2$ of gelatin, ~37.5 mgs./ft.$^2$ 4'-methylphenyl hydroquinone; and 9. a layer of gelatin coated at a coverage of ~40 mgs./ft.$^2$ of gelatin.

A transparent 4 mil. polyester film base was coated with the following illustrative layers;

1. the partial butyl ester of polyethylene/maleic anhydride copolymer at a coverage of about 2500 mgs./ft.$^2$ to provide a polymeric acid layer;

2. a timing layer containing about a 49:1 ratio of a 60/30/4/6 copolymer of butylacrylate, diacetone acrylamide, styrene and methacrylic acid and polyacrylamide at a coverage of about 500 mgs./ft.$^2$; and 3. a 2:1 mixture, by weight, of polyvinyl alcohol and poly-4-vinylpyridine, at a coverage of about 300 mgs./ft.$^2$ to provide a polymeric image-receiving layer.

The two components thus prepared were taped together in laminate form, at their respective edges, by means of a pressure-sensitive binding tape extending around, in contact with, and over the edges of the resultant laminate.

A rupturable container comprising an outer layer of lead foil and an inner liner or layer of polyvinyl chloride retaining an aqueous alkaline processing solution comprising per 25 grams of water: 0.7 grams sodium carboxymethylcellulose; 6.9 grams of 45% potassium hydroxide pellets; 0.13 grams of ithium hydroxide; 0.06 grams of lithium nitrate; 0.37 grams of benzotriazole; 0.2 grams of 6-methyl-5-bromo-4-azabenzimidazole; 0.2 grams of 6-methyl uracil; 0.26 grams of 6-benzyl-amino purine; 0.014 grams of bis-(β-aminoethyl)-sulfide; 28 grams of titanium dioxide; 0.36 grams of polyethylene glycol; 1.23 grams of an aqueous silica dispersion comprising about 30% $SiO_2$; 0.97 grams of N-phenethyl-α-picolinium bromide; 1.68 grams of N-benzyl-α-picolinium bromide; 0.56 grams of N-hydroxyethyl-ethylene diamine-N,N',N'-triacetic acid; 0.4 grams of (I)

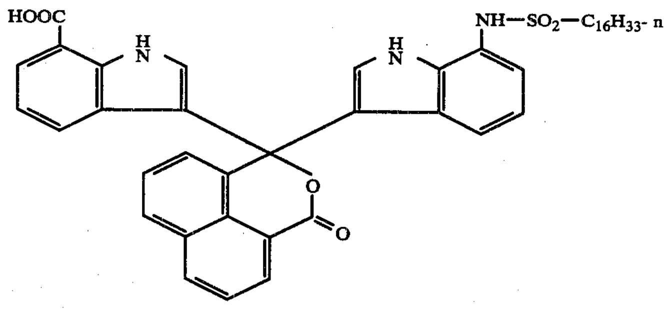

and 1.8 grams of (II)

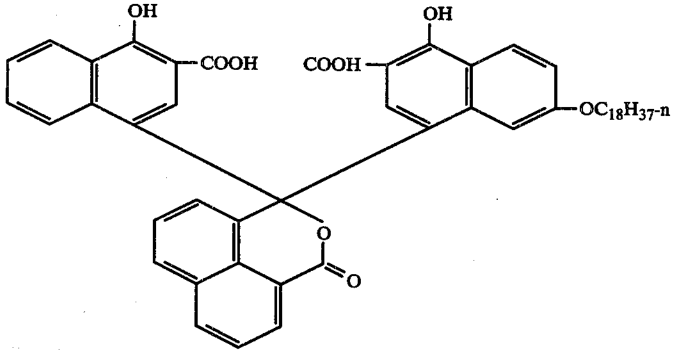

was fixedly mounted on the leading edge of each of the laminates, by pressure-sensitive tapes interconnecting the respective containers and laminates; such that, upon application of compressive pressure to a container, its contents may be distributed, upon rupture of the container's marginal seal, between the polymeric image-receiving layer and next adjacent gelatin layer.

Another structural embodiment for film units according to the invention is illustrated in connection with FIGS. 19–22. As shown in said Figures, the film unit, illustrated generally at 100, comprises a rupturable container 102 retaining, prior to processing, aqueous alkaline solution 104 and a multilaminate photo-responsive portion including, in order, a dimensionally stable transparent layer 106; neutralizing layer 108, spacer layer 110; interlayer 112; blue-sensitive silver halide emulsion layer 114 containing yellow dye developer; interlayer 116; green-sensitive silver halide emulsion layer 118 containing magenta dye developer; interlayer 120; red-sensitive silver halide emulsion layer 122 containing cyan dye developer; opaque layer 124; image-receiving layer 126; spacer layer 128; neutralizing layer 130; and dimensionally stable transparent layer 132, both layers 132 and 106 comprising an actinic radiation transparent and processing composition impermeable flexible sheet material. Thus constituted, it will be apparent that film unit 100 is designed for employment in a photographic device providing for exposure through transparent layer 106 and post processing viewing of a resultant transfer image through a transparent layer 132.

As in the earlier embodiment, a binding member 134, which may be present as a pressure-sensitive tape, is utilized to secure the various elements of the film unit together. For instance, tape 134 is extended at 136 and 138 to retain processing pod or container 102 in appropriate position. Further, the tape serves to form a chamber or trap area 137 adapted to secure and retain excess processing compositon 104. Through the use of such a chamber, adequate processing composition coverage may be assured.

As in the earlier embodiment, a rupturable container 102 is attached to the leading edge of the photosensitive structure of the film unit, however, in the present structure container 102 is aligned to dispense its contents 104 at a location intermediate layers 110 and 112. The mechanism for carrying out the processing composition dispensation may, as before, include pressure-applying rolls as at 139.

In general, and in the preferred embodiment, the opacity of processing composition 104, when distributed, will be sufficient to prevent further exposure of the film unit's silver halide emulsion or emulsions by radiation incident upon transparent layer 106 during processing of the unit in the presence of radiation actinic to the emulsion or emulsions. Accordingly, the film unit may be processed, subsequent to exposure, in the presence of such radiation in view of the fact that the silver halide emulsion or emulsions of the laminate are appropriately protected from incident radiation, at one major surface by the opaque layer or layers 124 and at the remaining major surface by opaque processing composition 104. The selected opaque layer or layers 124, however, should be one providing a background suitable for viewing the resultant dye developer transfer image formed in the dyeable polymeric layer. In general, while substantially any opaque processing composition and permeable opaque layer may be employed, it is preferred that opaque layer 124 be so constituted that it will not interfere with the color integrity of the dye transfer image carried by the receiving layer 126, as viewed by the observer through transparent layer 132. Particularly desirable opaque compositions will be those providing a white background for viewing the transfer image, and specifically those adapted to be employed as background for reflection photographic prints.

A particularly preferred opaque layer comprises titanium dioxide due to its highly effective reflection properties. In general, a coating composition, for example, hydroxyethylcellulose, containing sufficient titanium dioxide to provide a percent reflectance of about 85 to 90% will be employed. Other permeable polymeric matrices or binders, such as, for example, gelatin, polyvinyl alcohol, and the like, may also be used.

Where it is desirable to increase the opacifying capacity of a layer containing, for example, titanium dioxide, beyond that ordinarily obtained, an additional opacifying agent such as carbon black, for example, in a concentration of about one part carbon black to 100 to 500 parts titanium dioxide may be provided to the layer. Preferably, however, such additional opacifying capacity will be provided by constituting the opacifying layer as a plurality of more or less discrete layers, the layer next adjacent the receiving layer comprising a light-reflecting layer and the succeeding layer or layers comprising one or more opacifying agents possessing greater opacifying capacity than that ordinarily obtained from the reflecting agent or agents employed.

Such additional opacifying agents may be any of the multiplicity of the agents known in the art. In preference, the agent or agents should be selected which possess the maximum opacifying capacity per unit weight, is photographically non-deleterious and is substantially non-diffusible throughout the film unit subsequent to distribution. A particularly preferred agent has been found to comprise carbon black employed in a concentration effective, taken together with the selected reflecting agent, to provide the opacity required to prevent undesired fogging of the silver halide emulsion by radiation transmitted through the transparent support.

A particularly preferred processing composition opacifying agent comprises carbon black due to its highly effective light-absorption properties.

In the performance of the diffusion transfer multicolor process employing film unit 100, the unit is exposed to radiation actinic to its photosensitive structure which is incident on transparent layer 106. Following this exposure, film unit 100 is processed by being passed through opposed suitably gapped rolls 139 in order to apply compressive pressure to container 102 to effect rupture of its longitudinal seal and provide for the distribution of processing composition 104, containing opacifying agent and having a pH at which the cyan, magenta and yellow dye developers are soluble and diffusible, intermediate first spacer layer 110 and interlayer 112 coextensive of their respective surfaces. The orientation of the components of film unit 100 following this distribution is revealed in FIGS. 21 and 22.

Processing composition 104 permeates through layer 112 and into emulsion layers 114, 118 and 122 to initiate development of the latent images contained in the respective emulsions. The cyan, magenta and yellow dye developers of layers 114, 188 and 122 are immobilized, as a function of the development of their respective associated silver halide emulsions, preferably substantially as a result of their conversion from the reduced form to their relatively insoluble and nondiffusible oxidized form, thereby providing imagewise distributions of mobile, soluble and diffusible cyan, magenta and yellow dye developer, as a function of the point-to-point degree of their associated emulsions' exposure. At least part of the imagewise distributions of mobile cyan, magenta and yellow dye developers transfer, by diffusion, to processing composition dyeable polymeric layer 126 to provide to such layer a multicolor light transfer image viewable through dimensionally stable layer 132. Subsequent to substantial transfer image formation, a sufficient portion of the alkaline ions transfer, by diffusion, through permeable spacer layers 110 and 128 and to permeable polymeric acid layers 108 and 130 to reduce the pH, as a function of neutralization, to a pH at which the cyan, magenta and yellow dye developers, in the reduced form, are substantially insoluble and non-diffusible, to thereby provide increased stability to the multicolor dye transfer image.

If desired, the processing composition may contain a white pigment, e.g., as described above in connection with FIGS. 15–18, thereby providing a white "back" instead of a "black" back in the processed film unit. Further, the film unit may be so constructed as to include only one neutralizing layer, i.e., layer 108 or layer 130.

The auxiliary layer 112 may be so constituted as to restrict the permeation therethrough of image dye-providing material, in accordance with the disclosure of the copending application of P. A. Cardone, Ser. No. 393,799 filed Sept. 4, 1973 (now U.S. Pat. No. 3,888,669 issued June 10, 1975).

The present invention will be further illustrated and detailed in conjunction with the following illustrative construction of the instant embodiment. Film units similar to that shown in FIGS. 19–22 of the drawings were prepared by providing on a first 4 mil. transparent polyester film base, the following layers.

1. the partial butyl ester of polyethylene/maleic anhydride copolymer at a coverage of about 2500 mgs./ft.$^2$ to provide a polymeric acid layer;
2. a timing layer containing about a 49:1 ratio of a 60/30/4/6 copolymer of butylacrylate, diacetone acrylamide, styrene and methacrylic acid and polyacrylamide at a coverage of about 500 mgs./ft.$^2$; and
3. a 2:1 mixture, by weight, of polyvinyl alcohol and poly-4-vinylpyridine, at a coverage of about 300 mgs./ft.$^2$ to provide a polymeric image-receiving layer;
4. a 25.1 mixture of titanium dioxide and a 60/30/4/6 copolymer of butyl acrylate, diacetone acrylamide, styrene and methacrylic acid at a converage of about 1800 mgs./ft.$^2$;
5. gelatin at a coverage of about 50 mgs./ft.$^2$;
6. a 1:0.8:0.1 mixture of carbon black, Rhoplex E-32 (an acrylic latex sold by Rohm and Haas Co., Philadelphia, Pa., U.S.A.) and polyacrylamide at a coverage of about 240 mgs./ft.$^2$ measured as carbon;
7. a 1:1 mixture of (a) a solid dispersion of the cyan dye developer

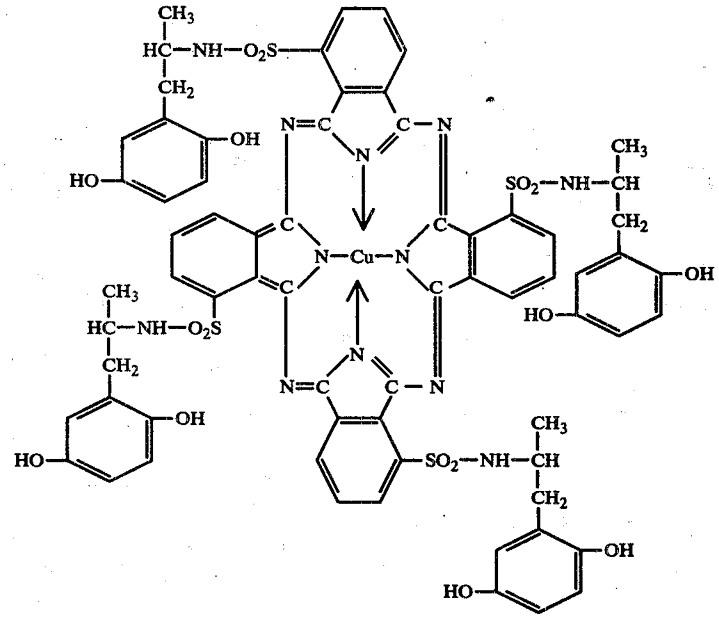

gelatin and polyvinyl hydrogen phthalate coated to provide a coverage of about 80 mgs./ft.$^2$ dye developer, about 97 mgs./ft.$^2$ of gelatin and about 5 mgs/ft.$^2$ of polyvinyl hydrogen phthalate and (b) a red-sensitive gelatino silver iodobromide emulsion having a 0.625 mole percent iodide content and coated to provide a coverage of about 67 mgs./ft.$^2$ silver iodobromide measured as silver and about 29 mgs./ft.$^2$ gelatin;

8. a red sensitive gelatino silver iodobromide emulsion having a 0.625 mole percent iodide content and polyvinyl hydrogen phthalate coated at a coverage of about 80 mgs./ft.$^2$ silver iodobromide measured as silver, about 60 mgs./ft.$^2$ gelatin and about 0.8 mgs./ft.$^2$ polyvinyl hydrogen phthalate;
9. a layer of butyl acrylate/diacetone acrylamide/styrene/methacrylic acid (60/30/4/6) and polyacrylamide coated in a ratio of about 29:1, respectively, at a coverage of about 165 mgs./ft.$^2$ and 5 mgs./ft.$^2$ succindialdehyde;
10. a 1:1 mixture of (a) a solid dispersion of the magenta dye developer.

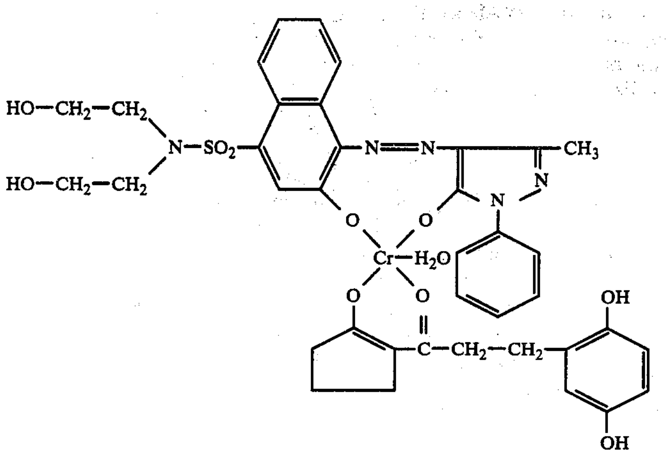

and gelatin coated to provide a coverage of about 110 mgs./ft.$^2$ of dye developer and about 87 mgs./ft.$^2$ of gelatin and (b) a green-sensitive gelatino silver iodobromide emulsion having a 0.625 mole percent iodide content and coated to provide a coverage of about 80 mgs./ft.$^2$ silver iodobromide measured as silver and about 22 mgs./ft.$^2$ gelatin;

11. a green-sensitive gelatino silver iodobromide emulsion having a 0.625 mole percent iodide content and polyvinyl hydrogen phthalate coated at a coverage of about 60 mgs./ft.$^2$ silver iodobromide measured as silver, about 87 mgs./ft.$^2$ gelatin and about 1.3 mgs./ft.$^2$ polyvinyl hydrogen phthalate;

12. a layer of butyl acrylate/diacetone acrylamide/-styrene/methacrylic acid (60/30/4/6) and polyacrylamide coated in a ratio of about 29:4, respectively, at a coverage of about 200 mgs./ft.$^2$ and succindialdehyde coated at a coverage of about 10 mgs./ft.$^2$;

13. a 1:1 mixture of (a) a solid dispersion of the yellow dye developer

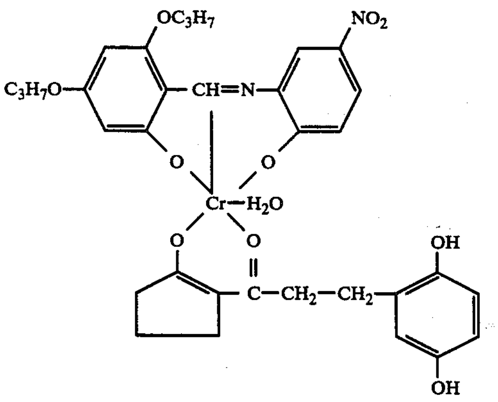

and gelatin coated to provide a coverage of about 120 mgs./ft.$^2$ dye developer and about 48 mgs./ft.$^2$ of gelatin; and (b) a blue-sensitive gelatino silver iodobromide emulsion having a 0.625 mole percent iodide content and polyvinyl hydrogen phthalate coated to provide a coverage of about 50 mgs./ft.$^2$ silver iodobromide measured as silver, about 22 mgs./ft.$^2$ gelatin and about 0.3 mgs./ft.$^2$ polyvinyl hydrogen phthalate;

14. a blue-sensitive gelatino silve iodobromide emulsion having a 0.625 mole percent iodide content, polyvinyl hydrogen phthalate and 4'-methylphenyl hydroquinone coated at a coverage of about 133 mgs./ft.$^2$ silver iodobromide measured as silver, about 66 mgs./ft.$^2$ gelatin, about 0.6 mgs./ft.$^2$ polyvinyl hydrogen phthalate and about 25 mgs./ft.$^2$ 4'-methylphenyl hydroquinone;

15. gelatin at a coverage of about 40 mgs./ft.$^2$

A second 4 mil. transparent polyester film base was then taped to the photosensitive element in laminate form, at their respective lateral and trailing edges, by means of a pressure-sensitive binding tape extending around, in contact with, and over the edges of the resultant laminate.

A rupturable container comprising an outer layer of lead foil and an inner liner or layer of polyvinyl chloride retaining an aqueous alkaline processing solution comprising about 0.8 cc. of 0.5 cc. of 1N potassium hydroxide and about 0.8 cc. of a composition comprising about 100 cc. of water, about 10.5 grams of potassium hydroxide, about 2.3 grams of sodium carboxymethyl cellulose, about 95.6 grams of titanium dioxide, about 2.9 grams of N-benzyl-α-picolinium bromide, about 1.7 grams of N-phenethyl-α-picolinium bromide, about 1.7 grams of an aqueous silica dispersion comprising about 30 percent $SiO_2$, about 1.3 grams of benzotriazole, about 0.06 gram of 6-methyl-5-bromo-4-azabenzimidazole, about 0.67 gram of 6-methyl uracil, about 0.47 gram of bis-(β-aminoethyl)-sulfide, about 0.94 gram of 6-benzyl-amino purine, about 1.22 grams of polyethylene glycol, about 1.9 gram of N-hydroxyethylethylene diamine-N,N',N'-triacetic acid, about 0.22 gram of lithium nitrate, and about 0.25 gram of lithium hydroxide and sufficient (Constituent I supra and Constituent II supra) to provide an optical transmission density greater than about 6 for the layer of applied processing composition was then fixedly mounted on the leading edge of each of the laminates, by pressure-sensitive tapes interconnecting the respective containers and laminates, such that, upon application of compressive pressure to the container, its contents may be distributed, upon rupture of the container's marginal seal, between the second transparent polyester film base and its next adjacent layer.

This invention has been illustrated by the use of dye developers as color transfer image-forming materials. As an example of other dye image-forming materials which may be employed mention may be made of the cleavable thiazolidine compounds described in U.S. Pat. No. 3,719,489 issued Mar. 6, 1973.

In a particularly useful embodiment, the photosensitive element includes a 2-substituted benzimidazole, e.g., 2-phenyl-benzimidazole, positioned in at least one of the silver halide emulsions or in a layer adjacent thereto, as described and claimed in the copending application of Ronald F. Lambert and Howard G. Rogers, Ser. No. 596,384 filed July 16, 1975 and now U.S. Pat. No. 4,057,425, which application is hereby incorporated herein by reference.

The use of the silver halide emulsions constituted in accordance with this invention has been found to provide dye transfer images exhibiting lower slope and generally improved sensitometry. While the prior art, e.g., the aforementioned Timson U.S. Pat. Nos. 3,697,269, 3,697,270 and 3,697,271, has proposed the use of silver halide emulsions having narrow grain size distributions, those emulsions have been prepared by slow double jet techniques and have given relatively high contrast (high slope) dye transfer images unless blended.

Timson U.S. Pat. No. 3,960,557 proposes the use of silver halide grains having substantially the same iodide content, the silver halide grains employed being obtained by fractionating a silver halide emulsion prepared by single jet precipitation and blending several fractions. In contrast the silver halide emulsions used in accordance with the present invention have a controlled size distribution, without fractionation, as the result of the selected iodide concentration.

It is recognized that silver iodobromide emulsions having an iodide content within the range of the silver halide emulsions of this invention are described in the literature. Thus, Trivelli and Smith, *The Photographic Journal,* Vol. 80, pp. 285–88 (1049) disclose a 0.77 mole percent iodide silver iodobromide emulsion. A careful review of that paper, however, shows that the authors considered the grain size distribution of a 0.77 mole percent iodide emulsion to be substantially the same as one with 2.56 mole percent iodide, on the basis of the projected areas of the grains. In contrast, the coefficient of variation derived using the mean volume diameter as herein disclosed shows a marked difference in the size distribution. This difference the art not only has failed to appreciate but, more importantly, has failed to recognize that this characteristic may be used to define iodide-containing silver halide emulsions which would give improved sensitometry in dye diffusion transfer processes.

Since certain changes may be made in the above product and process without departing from the scope of the invention herein involved, it is intended that all matter contained in the above description or shown in the accompanying drawings shall be interpreted as illustrative and not in a limiting sense.

I claim:

1. A photographic product for use in forming a diffusion transfer image in color comprising a photosensitive element comprising a support carrying a blue-sensitive silver halide emulsion having a yellow dye developer associated therewith, a green-sensitive silver halide emulsion having a magenta dye developer associated therewith, and a red-sensitive silver halide emulsion having a cyan dye developer associated therewith; a second, sheet-like element positioned in superposed or superposable relationship with said photosensitive element; an image-receiving layer positioned in one of said elements; a rupturable container releasably holding an aqueous alkaline processing composition adapted, when distributed between a pair of predetermined layers carried by said photosensitive element and said second element, to develop said silver halide emulsions and provide a diffusion transfer image in color in said image-receiving layer; at least one of said silver halide emulsions having an iodide content of about 0.625 mole percent, the grains of said silver halide emulsion being non-regular in habit and having a mean volume diameter of about 0.5 to 2 μ, said grains exhibiting a coefficient of variation of less than about 35 percent.

2. A photographic product as defined in claim 1 wherein said iodide containing silver halide emulsion is a silver iodochlorobromide emulsion.

3. A photographic product for use in forming a diffusion transfer image in color comprising a photosensitive element comprising a support carrying a blue-sensitive silver halide emulsion having a yellow dye developer associated therewith, a green-sensitive silver halide emulsion having a magenta dye developer associated therewith, and a red-sensitive silver halide emulsion having a cyan dye developer associated therewith; a second, sheet-like element positioned in superposed or superposable relationship with said photosensitive element; an image-receiving layer positioned in one of said elements; a rupturable container releasably holding an aqueous alkaline processing composition adapted, when distributed between a pair of predetermined layers carried by said photosensitive element and said second element, to develop said silver halide emulsions and provide a diffusion transfer image in color in said image-receiving layer; at least one of said silver halide emulsions having an iodide content of about 0.625 mole percent, the grains of said silver halide emulsion being non-regular in habit and having a mean volume diameter of about 0.9 to 1.2 μ, said grains exhibiting a coefficient of variation of less than about 35 percent.

4. A photographic product for use in forming a diffusion transfer image in color comprising a photosensitive element comprising a support carrying a blue-sensitive silver halide emulsion having a yellow dye developer associated therewith, a green-sensitive silver halide emulsion having a magenta dye developer associated therewith, and a red-sensitive silver halide emulsion having a cyan dye developer associated therewith; a second, sheet-like element positioned in superposed or superposable relationship with said photosensitive element; an image-receiving layer positioned in one of said elements; a rupturable container releasably holding an aqueous alkaline processing composition adapted, when distributed between a pair of predetermined layers carried by said photosensitive element and said second element, to develop said silver halide emulsions and provide a diffusion transfer image in color in said image-receiving layer; at least one of said silver halide emulsions having an iodide content of about 0.625 mole percent, the grains of said silver halide emulsion being non-regular in habit and having a mean volume diameter of about 0.9 to 1.2 μ, said grains exhibiting a coefficient of variation of less than about 30 percent.

5. A photosensitive element which comprises a support carrying a plurality of layers including at least one photosensitive layer comprising photographic silver halide grains having an iodide content of about 0.625 mole percent, the grains of said silver halide emulsion being non-regular in habit and having a mean volume diameter of about 0.5 to 2 μ, said grains exhibiting a coefficient of variation of less than about 35 percent, said emulsion having associated therewith a diffusion transfer process dye image-forming material.

6. A photographic diffusion transfer process film unit which comprises a plurality of layers including a direct negative photosensitive layer comprising photographic silver halide grains non-regular in habit and having an iodide content of about 0.625 mole percent and exhibiting with respect to the size distribution thereof a coefficient of variation having a value of less than 30 percent; said photosensitive layer having associated therewith a diffusion transfer process dye image-forming material; one of said layers being adapted to receive diffusion transfer process dye image-forming material diffusing thereto; and at least one of the plurality of layers externally disposed to provide support means.

7. A photosensitive element comprising a support carrying at least one silver halide photographic emulsion, each of said silver halide emulsions having associated therewith a dye developer, at least one of said silver halide emulsions having grains having an iodide content of about 0.625 mole percent, the grains of said silver halide emulsion being non-regular in habit and having a mean volume diameter of about 0.9 to 1.2 $\mu$, said grains exhibiting a coefficient of variation of less than about 35 percent.

8. A photosensitive element comprising a support carrying at least one silver halide photographic emulsion, each of said silver halide emulsions having associated therewith a dye developer, having an iodide content of about 0.625 mole percent, the grains of said silver halide emulsion being non-regular in habit and having a mean volume diameter of about 0.9 to 1.2 $\mu$, said grains exhibiting a coefficient of variation of less than about 30 percent.

9. A photographic diffusion transfer process film unit which comprises a plurality of layers including a photosensitive layer comprising photographic silver halide grains having an iodide content of about 0.625 mole percent and being non-regular in habit and having a mean volume diameter of about 0.5 to 2 $\mu$, said grains exhibiting a size distribution coefficient of variation less than 35 percent; said photosensitive layer having associated therewith a diffusion transfer process dye image-forming material; one of said layers being adapted to receive diffusion transfer process dye image-forming material diffusing thereto; and at least one of the plurality of layers externally disposed to provide support means.

10. The photographic diffusion transfer process film unit of claim 9 including means for contacting said photosensitive silver halide layer with an aqueous alkaline processing composition.

11. The photographic diffusion transfer process film unit as defined in claim 10 wherein said means for contacting said photosensitive silver halide layer with said processing composition comprises a rupturable container containing said processing composition positioned extending transverse an edge of the film unit to effect, upon application of compressive pressure to said container, discharge of said container's processing composition contents into contact with said photosensitive silver halide layer.

12. The photographic diffusion transfer process film unit of claim 9 in which the remaining halide in said silver halide grains is bromide and chloride.

13. The photographic diffusion transfer process film unit of claim 9 including a light-reflecting agent adapted to be disposed intermediate said photosensitive layer and said layer adapted to receive dye image-forming material diffusing thereto.

14. The photographic diffusion transfer process film unit as defined in claim 9 including means for converting the pH of said processing composition from a pH at which a diffusion transfer process dye image-forming material is diffusible to a second pH at which said dye image-forming material is substantially nondiffusible.

15. A photographic diffusion transfer process film unit which comprises a plurality of layers including a photosensitive layer comprising photographic silver halide grains having an iodide content of about 0.625 mole percent, said grains being non-regular in habit and having a mean volume diameter of about 0.9 to 1.2 $\mu$, said grains exhibiting a coefficient of variation within the range of about 26 to 30 percent, said photosensitive layer having associated therewith a diffusion transfer process dye image-forming material; one of said layers being adapted to receive diffusion transfer process dye image-forming material diffusing thereto; and at least one of the plurality of layers externally disposed to provide support means.

16. The photographic diffusion transfer process film unit of claim 15 wherein the remaining halide in said grains is bromide.

17. The photographic diffusion transfer process film unit of claim 15 including means for contacting said photosensitive silver halide layer with an aqueous alkaline processing composition.

18. The photographic diffusion transfer process film unit as defined in claim 17 wherein said means for contacting said photosensitive silver halide layer with said processing composition comprises a rupturable container containing said processing composition positioned extending transverse an edge of the film unit to effect, upon application of compressive pressure to said container, discharge of said container's processing composition contents into contact with said photosensitive silver halide layer.

19. The photographic diffusion transfer process film unit of claim 15 in which the remaining halide in said silver halide grains is bromide and chloride.

20. The photographic diffusion transfer process film unit of claim 15 including a light-reflecting agent adapted to be disposed intermediate said photosensitive layer and said layer adapted to receive dye image-forming material diffusing thereto.

21. The photographic diffusion transfer film unit defined in claim 20 including a transparent support through which the image provided by transferred dye image-forming material may be viewed against a light-reflecting layer provided by said light-reflecting agent, said film unit including means for maintaining said film unit intact subsequent to processing.

22. The photographic diffusion transfer process film unit as defined in claim 15 including means for converting the pH of said processing composition from a pH at which a diffusion transfer process dye image-forming material is soluble and diffusible to a second pH at which said dye image-forming material is substantially nondiffusible.

23. A process of forming transfer images in color which comprises, in combination, the steps of:

exposing a photographic film unit which includes a plurality of layers comprising: a photosensitive element comprising a support carrying a photographic silver halide layer comprising silver halide grains having an iodide content of about 0.625 mole percent, the grains of said silver halide emulsion being non-regular in habit and having a mean volume diameter of about 0.5 to 2 μ, said grains exhibiting a coefficient of variation of less than about 35 percent, said layer having associated therewith a diffusion transfer process dye image-providing material;

developing said exposed silver halide layer with an aqueous alkaline processing composition;

forming thereby an imagewise distribution of diffusible dye image-providing material, as a function of said development of said exposed silver halide layer;

transferring by diffusion at least a portion of said imagewise distribution of said diffusible dye image-providing material to an image-receiving layer in superposed relationship with said developed silver halide layer to impart to said image-receiving layer a dye transfer image.

24. A process as defined in claim 23 wherein said silver halide grains have a mean volume diameter of about 0.9 to 1.2 μ.

25. A process as defined in claim 23 wherein said silver halide grains are silver iodochlorobromide grains.

26. A process as defined in claim 23 wherein said silver halide grains have a mean volume diameter of about 0.9 to 1.2 μ, said grains exhibiting a coefficient of variation of less than about 30 percent.

27. A process as defined in claim 23 wherein said dye image-providing material is a dye developer.

28. A process as defined in claim 23 wherein said image-receiving layer is carried by a transparent support, said processing composition includes a white pigment, and said layers are maintained together after said transfer image is formed, said transfer image being viewable through said transparent support.

29. A process as defined in claim 23 wherein said image-receiving layer is carried by a second support, and said second support and said image-receiving layer are separated from the developed photosensitive element after said transfer image is formed.

30. A process of forming transfer images in color which comprises, in combination, the steps of:

exposing a photosensitive element comprising a support carrying a photosensitive silver halide layer comprising silver halide grains with an iodide content of about 0.625 mole percent, said grains being non-regular in habit and having a mean volume diameter of about 0.9 to 1.2 μ, said grains exhibiting a coefficient of variation of less than about 30 percent, said layer having associated therewith a dye developer;

developing said exposed silver halide layer with an aqueous alkaline processing composition; forming thereby an imagewise distribution of diffusible dye developer as a function of said development; and transferring by diffusion at least a portion of said imagewise distribution of said diffusible dye developer to said image-receiving layer in superposed relationship with said developed silver halide layer to impart thereto a dye transfer image.

31. A process as defined in claim 30 wherein the remaining halide in said halide emulsion grains is bromide.

32. A process as defined in claim 30 wherein said photosensitive element comprises a support carrying:

a red-sensitive silver halide emulsion layer having associated therewith a cyan dye developer;

a green-sensitive silver halide emulsion layer having associated therewith a magenta dye developer; and a blue-sensitive silver halide emulsion layer having associated therewith a yellow dye developer;

the silver halide grains of at least one of said red-sensitive, green-sensitive and blue-sensitive silver halide layers having an iodide content of about 0.625 mole percent, the grains of said silver halide emulsion being non-regular in habit and having a mean volume diameter of about 0.9 to 1.2 μ, said grains exhibiting a coefficient of variation of less than about 30 percent.

33. A process as defined in claim 32 wherein said mean volume diameter is about 1 μ.

34. A photographic diffusion transfer process film unit which comprises a plurality of layers including a direct negative photosensitive layer comprising photographic silver halide grains non-regular in habit and having an iodide content within a range of between about 0.25 and 1.5 mole percent; said iodide content selected within said range to provide a size distribution of said grains exhibiting substantially the optimally lowest value of coefficient of variation as identified by curves as shown in FIGS. 7 and 13 hereof; said photosensitive layer having associated therewith a diffusion transfer process dye image-forming material; a said layer adapted to receive diffusion transfer process dye image-forming material diffusing thereto; and at least one of the plurality of layers externally disposed to provide support means.

35. A photographic product comprising a photosensitive element, said photosensitive element comprising a support carrying at least one silver halide photographic emulsion, each of said silver halide emulsions having associated therewith a dye which is a silver halide developing agent, at least one of said silver halide emulsions having grains non-regular in habit and having an iodide content within a range of between about 0.25 and 1.5 mole percent; said iodide content selected within said range to provide a size distribution of said grains exhibiting substantially the optimally lowest coefficient of variation as identified by curves as shown in FIGS. 7 and 13 hereof; an image-receiving element comprising a support carrying an image-receiving layer; and a rupturable container releasably holding an aqueous alkaline processing solution; said photosensitive element and said image-receiving element being configured for mutual superposition and operably associable with said rupturable container so as to provide for the release of said processing solution upon rupture of said container to permeate said silver halide emulsion and said image-receiving layer.

36. A photographic product for forming a diffusion transfer dye image which comprises, in combination:

a photosensitive element including an emulsion layer, the silver halide grains therewithin being non-regular in habit and having less than a 1.5 mole percent iodide content, said content being selected to provide a grain size distribution exhibiting the optimally lowest coefficient of variation as identified by curves as shown in FIGS. 7 and 13 hereof, said emulsion layer further having associated therewith a dye image-providing material;

an image-receiving element including an image-receiving layer;

means providing a processing composition for initiating development of said silver halide emulsion after photoexposure to form thereby an imagewise distribution of mobile dye image-providing material which is transferred, at least in part, to said image-receiving layer to impart thereto a dye image;

said photosensitive element and said image-receiving element including externally disposed support means; and said image-receiving element being adapted to separate from contact with said processing composition subsequent to the formation of said dye image.

* * * * *